United States Patent
Raveendran

(10) Patent No.: US 8,406,245 B2
(45) Date of Patent: Mar. 26, 2013

(54) SYSTEM AND METHOD OF TRANSMITTING CONTENT FROM A MOBILE DEVICE TO A WIRELESS DISPLAY

(75) Inventor: Vijayalakshmi R. Raveendran, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 889 days.

(21) Appl. No.: 12/500,475

(22) Filed: Jul. 9, 2009

(65) Prior Publication Data

US 2011/0010607 A1 Jan. 13, 2011

(51) Int. Cl.
*H04L 12/56* (2006.01)
(52) U.S. Cl. ......................................... 370/412; 714/776
(58) Field of Classification Search .................. 370/412, 370/470, 471; 714/776
See application file for complete search history.

(56) References Cited

U.S. PATENT DOCUMENTS

| | | | | |
|---|---|---|---|---|
| 5,949,949 A * | 9/1999 | Kim | ................ | 386/307 |
| 2005/0036509 A1 | 2/2005 | Acharya et al. | | |
| 2006/0268841 A1* | 11/2006 | Nagaraj et al. | ................ | 370/352 |
| 2007/0135038 A1 | 6/2007 | Peele | | |
| 2008/0201751 A1 | 8/2008 | Ahmed et al. | | |
| 2008/0253465 A1* | 10/2008 | Richardson et al. | ...... | 375/240.26 |
| 2008/0294851 A1* | 11/2008 | Wernet et al. | ................. | 711/147 |

FOREIGN PATENT DOCUMENTS

| | | |
|---|---|---|
| WO | 03104922 A2 | 12/2003 |
| WO | 2006124854 A2 | 11/2006 |

OTHER PUBLICATIONS

International Search Report and Written Opinion of the International Searching Authority for PCT/US2010/040968, International Searching Authority—European Patent Office. Feb. 23, 2011.

* cited by examiner

*Primary Examiner* — Brian D Nguyen
(74) *Attorney, Agent, or Firm* — Elaine H. Lo

(57) ABSTRACT

A method of transmitting content to a wireless display device is disclosed. The method may include receiving multimedia data, encoding the multimedia data, and writing encoded multimedia data into a first predetermined memory location of a shared memory. Further, the method may include encapsulating the encoded multimedia data and writing encapsulation data into a second predetermined memory location of the shared memory. The method may also include calculating error control encoding and writing the error control encoding into a third predetermined memory location of the shared memory. Further, the method may include transmitting the encoded multimedia data, the encapsulation data, and the error control encoding to the wireless display device.

40 Claims, 14 Drawing Sheets

SYSTEM AND METHOD OF TRANSMITTING CONTENT FROM A MOBILE DEVICE TO A WIRELESS DISPLAY

FIELD

The present invention generally relates to the operation of mobile devices, and more particularly, to systems and methods for transmitting audio/video content from a mobile device to a wireless display.

DESCRIPTION OF THE RELATED ART

In a wireless display system, a composite image displayed on embedded (primary) display of a mobile device may be streamed in real-time to an external display wirelessly. Audio presented at the speaker on the device may also be streamed in real-time to the speakers associated with the external display device. Usage scenarios include concurrent presentation of video and graphics on multiple displays including touch screen displays. During transmission latencies can interrupt the data flow and cause a pour user experience.

Therefore, what is needed is an improved system and method for transmitting audio/video content from a mobile device to a wireless display.

SUMMARY OF THE DISCLOSURE

A method of transmitting content to a wireless display device is disclosed. The method may include receiving multimedia data, encoding the multimedia data, and writing encoded multimedia data into a first predetermined memory location of a shared memory. Further, the method may include encapsulating the encoded multimedia data and writing encapsulation data into a second predetermined memory location of the shared memory. The method may also include calculating error control encoding and writing the error control encoding into a third predetermined memory location of the shared memory. Further, the method may include transmitting the encoded multimedia data, the encapsulation data, and the error control encoding to the wireless display device.

Additionally, the method may further include determining at least one of a channel bandwidth, a packet error rate, and a desired latency. Also, the method may include calculating at least one of a video packet size, transport header characteristics and a corresponding length, and an outer coding rate and a corresponding medium access control (MAC) header length. In a particular aspect, the video packet size, the transport header characteristics and the corresponding length, and the outer coding rate and the corresponding MAC header length may be determined at least partially based on the channel bandwidth, the packet error rate and the desired latency.

The method may also include allocating a first memory address length for a MAC header, allocating a second memory address length for a transport header, allocating a third memory address length for a video packet, and writing coded video data into the predetermined memory locations of the shared memory. The method may further include obtaining metadata from a video encoder, preparing headers for one or more coded video data segments, creating parity data for the one or more coded video data segments, and inserting the parity data at the end of the one or more coded video data segments.

In another aspect, a wireless device is disclosed and may include means for receiving multimedia data, means for encoding the multimedia data, and means for writing encoded multimedia data into a first predetermined memory location of a shared memory. Further, the wireless device may include means for encapsulating the encoded multimedia data and means for writing encapsulation data into a second predetermined memory location of the shared memory. Also, the wireless device may include means for calculating error control encoding and means for writing the error control encoding into a third predetermined memory location of the shared memory. Further, in this aspect, the wireless device may include means for transmitting the encoded multimedia data, the encapsulation data, and the error control encoding to the wireless display device.

In yet another aspect, a wireless device is disclosed and may include a processor. The processor may he operable to receive multimedia data, encode the multimedia data, and write encoded multimedia data into a first predetermined memory location of a shared memory. Moreover, the processor may be operable to encapsulate the encoded multimedia data and write encapsulation data into a second predetermined memory location of the shared memory. The processor may also be operable to calculate error control encoding and write the error control encoding into a third predetermined memory location of the shared memory. Further, the processor may be operable to transmit the encoded multimedia data, the encapsulation data, and the error control encoding to the wireless display device.

In still another aspect, a computer program product is disclosed and may include a computer-readable medium. The computer-readable medium may include at least one instruction for receiving multimedia data, at least one instruction for encoding the multimedia data, and at least one instruction for writing encoded multimedia data into a first predetermined memory location of a shared memory. Further, the computer-readable medium may include at least one instruction for encapsulating the encoded multimedia data and at least one instruction for writing encapsulation data into a second predetermined memory location of the shared memory. The computer-readable medium may also include at least one instruction for calculating error control encoding and at least one instruction for writing the error control encoding into a third predetermined memory location of the shared memory. Moreover, the computer-readable medium may include at least one instruction for transmitting the encoded multimedia data, the encapsulation data, and the error control encoding to the wireless display device In yet another aspect, a method is provided for wirelessly transmitting data from a mobile device to a display device. The method includes the steps of (1) receiving in the mobile device first data to be included in a first packet; (2) receiving in the mobile device second data to be included in a second packet; (3) allocating locations of a memory buffer in which to store an encoded version of the first data, an encoded version of the second data, a first transport header data associated with the encoded version of the first data, a second transport header data associated with the encoded version of the second data, a first Media Access Control (MAC) header data associated with the first data, and a second MAC header data associated with the second data, wherein the locations are allocated such that the first encoded data, first transport header data and first MAC header data arc stored in contiguous memory locations and the second encoded data, second transport header data and second MAC header data are stored in contiguous memory locations; and (4) storing the first encoded data, first transport header data and first MAC header data in contiguous memory buffer locations and the second encoded data, second transport header data and second MAC header data in contiguous memory locations.

In yet another aspect, a method is provided of wirelessly transmitting data between a mobile device and a display device. The method includes the steps of (1) receiving data in the mobile device; (2) including the received data in transmission control protocol (TCP) segments; and (3) forwarding the TCP segments to the display device prior to application layer processing of the received data by the mobile device.

In yet another aspect, a system is provided for wirelessly transmitting data from a mobile device to a display device. The system includes (1) means for receiving in the mobile device first data to be included in a first packet; (2) means for receiving in the mobile device second data to be included in a second packet; (3) means for allocating locations of a memory buffer in which to store an encoded version of the first data, an encoded version of the second data, a first transport header data associated with the encoded version of the first data, a second transport header data associated with the encoded version of the second data, a first Media Access Control (MAC) header data associated with the first data, and a second MAC header data associated with the second data, wherein the locations are allocated such that the first encoded data, first transport header data and first MAC header data are stored in contiguous memory locations and the second encoded data, second transport header data and second MAC header data are stored in contiguous memory locations; and (4) means for storing the first encoded data, first transport header data and first MAC header data in contiguous memory buffer locations and the second encoded data, second transport header data and second MAC header data in contiguous memory locations.

In yet another aspect, a system is provided for wirelessly transmitting data between a mobile device and a display device. The system includes (1) means for receiving data in the mobile device; (2) means for including the received data in transmission control protocol (TCP) segments; and (3) means for forwarding the TCP segments to the display device prior to application layer processing of the received data by the mobile device.

In yet another aspect, a computer program product comprising computer readable medium is provided. The computer readable medium includes code for wirelessly transmitting data from a mobile device to a display device, which includes (1) code for causing first data to be included in a first packet to be received in the mobile device; (2) code for causing second data to be included in a second packet to be received in the mobile device; (3) code for causing locations of a memory buffer to be allocated in which to store an encoded version of the first data, an encoded version of the second data, a first transport header data associated with the encoded version of the first data, a second transport header data associated with the encoded version of the second data, a first Media Access Control (MAC) header data associated with the first data, and a second MAC header data associated with the second data, wherein the locations are allocated such that the first encoded data, first transport header data and first MAC header data are stored in contiguous memory locations and the second encoded data, second transport header data and second MAC header data are stored in contiguous memory locations; and (4) code for causing the first encoded data, first transport header data and first MAC header data to be stored in contiguous memory buffer locations and the second encoded data, second transport header data and second MAC header data to be stored in contiguous memory locations.

In yet another aspect, a computer program product comprising computer readable medium is provided. The computer readable medium includes code for wirelessly transmitting data between a mobile device and a display device which includes (1) code for causing data to be received in the mobile device; (2) code for causing received data to be included in transmission control protocol (TCP) segments; and (3) code for causing the TCP segments to be forwarded to the display device prior to application layer processing of the received data by the mobile device.

In yet another aspect, a method of wirelessly receiving data from a mobile device in a display device is provided. The method includes the steps of (1) receiving in the display device a first packet; (2) receiving in the display device a second packet; (3) allocating locations of a memory buffer associated with the display device in which to store encoded data from the first packet, encoded data from the second packet, transport header data from the first packet, transport header data from the second packet, Media Access Control (MAC) header data from the first packet, and MAC header data from the second packet, wherein the locations are allocated such that the encoded data, transport header data and MAC header data from the first packet are stored in contiguous memory locations and the encoded data, transport header data and MAC header data from the second packet are stored in contiguous memory locations; and (4) storing the encoded data, transport header data and MAC header data from first packet in contiguous memory buffer locations, and the encoded data, transport header data and MAC header data from the second packet in contiguous memory locations.

In yet another aspect, a system for wirelessly receiving data from a mobile device in a display device is provided. The system includes (1) means for receiving in the display device a first packet; (2) means for receiving in the display device a second packet; (3) means for allocating locations of a memory buffer associated with the display device in which to store encoded data from the first packet, encoded data from the second packet, transport header data from the first packet, transport header data from the second packet, Media Access Control (MAC) header data from the first packet, and MAC header data from the second packet, wherein the locations are allocated such that the encoded data, transport header data and MAC header data from the first packet are stored in contiguous memory locations and the encoded data, transport header data and MAC header data from the second packet are stored in contiguous memory locations; and (4) means for storing the encoded data, transport header data and MAC header data from first packet in contiguous memory buffer locations, and the encoded data, transport header data and MAC header data from the second packet in contiguous memory locations.

In yet another aspect, a computer program product comprising computer readable medium is provided. The computer readable medium includes code for wirelessly receiving data from a mobile device in a display device, which includes (1) code for causing a first packet to be received in the display device; (2) code for causing a second packet to be received in the display device; (3) code for causing allocation of locations of a memory buffer associated with the display device in which to store encoded data from the first packet, encoded data from the second packet, transport header data from the first packet, transport header data from the second packet, Media Access Control (MAC) header data from the first packet, and MAC header data from the second packet, wherein the locations are allocated such that the encoded data, transport header data and MAC header data from the first packet are stored in contiguous memory locations and the encoded data, transport header data and MAC header data from the second packet are stored in contiguous memory locations; and (4) code for causing the encoded data, transport header data and MAC header data from first packet to be stored in contiguous memory buffer locations, and the encoded data, transport header data and MAC header data from the second packet to be stored in contiguous memory locations.

BRIEF DESCRIPTION OF THE DRAWINGS

In the figures, like reference numerals refer to like parts throughout the various views unless otherwise indicated.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to he opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer-readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone," "wireless communications device," and "wireless handset" are used interchangeably. With the advent of third generation (3G) wireless technology, more bandwidth availability has enabled more electronic devices with wireless capabilities. Therefore, a wireless device could be a cellular telephone, a pager, a PDA, a smartphone, a navigation device, or a computer with a wireless connection.

Figure 1:
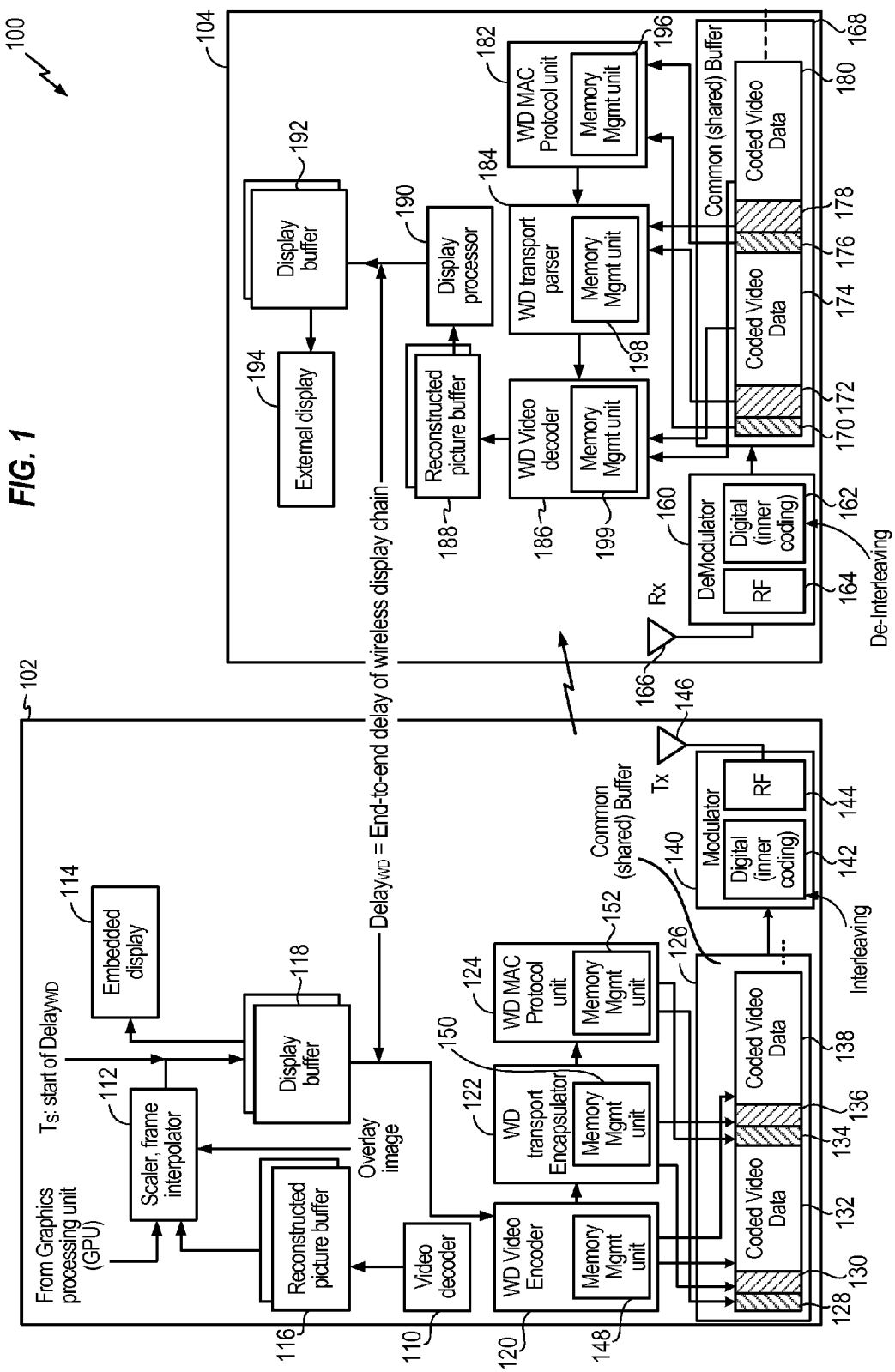
FIG. 1 is a diagram of a wireless display system.

Referring initially to FIG. 1, a wireless display system is shown and is generally designated 100. As shown, the wireless display system 100 may include a host system 102 and a client system 104. The host system 102 may be a wireless device such as a mobile telephone, a portable digital assistant (PDA), or some other mobile device. The client system 104 may be a wireless display, a wireless overhead projector, or some other wireless display device.

As shown, the host system 102 may include a video decoder 110, a scaler/frame interpolator 112, and an embedded display 114. A reconstructed picture buffer 116 may connect the video decoder 110 to the scaler/frame interpolator 112. Further, a display buffer 118 may connect the sealer/frame interpolator 112 to the embedded display 114. As indicated in FIG. 1, the scaler/frame interpolator may receive a signal form a graphics processing unit (GPU). Further, the scaler/frame interpolator may receive an overlay image.

FIG. 1 also shows that a wireless device (WD) video encoder 120 may also be connected to the display buffer 118. A WD transport encapsulator 122 may be connected to the WD video encoder 120. Moreover, a WD medium access control (MAC) protocol unit 124 may be connected to the WD transport encapsulator 122. As illustrated in FIG. 1, a common buffer 126 may be connected to the WD video encoder 120, the WD transport encapsulator 122, and the WD MAC protocol unit 124. The common buffer 126 may be also considered a shared buffer. Moreover, the common buffer 126 may be a memory in which the WD video encoder 120, the WD transport encapsulator 122, the WD MAC protocol unit 124, or a combination thereof may write data according to one or more of the method steps described herein.

For example, the WD MAC protocol unit 124 may write a first MAC header 128 into the common buffer 126. Thereafter, the WD transport encapsulator 122 may write a first transport header 130 into the common buffer 126. Moreover, the WD video encoder 120 may write a first coded video data segment 132 into the common buffer 126 such that the first MAC header 128, first transport header 130 and first coded video segment 132 are written into contiguous locations of the common buffer 126. Additionally, the WD MAC protocol unit 124 may write an Nth MAC header 134 into the common buffer 126. Following, the Nth MAC header 134, the WD transport encapsulator 122 may write an Nth transport header 136 into the common buffer 126. Thereafter, the WD video encoder 120 may write an Nth coded video data segment 138 into the common buffer 126 such that the Nth MAC header 134, Nth transport header 136 and Nth coded video data segment 138 are written into contiguous locations of the common buffer 126.

As shown in FIG. 1, a modulator 140 may be connected to the common buffer 126. The modulator 140 may include an inner coding module 142. The inner coding module 142 may be a digital module. The modulator 140 may also include a radio frequency (RF) module 144. In a particular aspect, the modulator 140 may receive a stream of data from the common buffer 126. For example, the modulator 140 may receive one or more MAC headers 128, 134; one or more transport headers 130, 136; one or more coded video data segments 132, 138; or a combination thereof. As depicted in FIG. 1, an antenna 146 may be connected to the modulator 140. The antenna 146 may be used to transmit data from the modulator 140, e.g., the data received from the common buffer 126.

In a particular aspect, the WD video encoder 120 may include a memory management unit 148. The WD transport encapsulator 122 may also include a memory management unit 150. Further, the WD MAC protocol unit 124 may include a memory management unit 152. In this aspect, the memory management units 148, 150, 152 may be used to map the physical address locations and pointers to the common buffer 126 into contiguous virtual address space as seen by each of these components for ease of implementation.

Still referring to FIG. 1, the client system 104 may include a demodulator 160. The demodulator 160 may include an inner coding module 162, e.g., a digital inner coding module. The demodulator 160 may also include an RF module 164. Further, an antenna 166 may he connected to the demodulator 160. The demodulator 160 may receive data from the modulator 140 via transmission between the antennas 146, 166. For example, the demodulator 160 may receive one or more MAC headers 128, 134; one or more transport headers 130, 136; one or more coded video data segments 132, 138; or a combination thereof from the common shared buffer 126 within the host system 102.

As shown in FIG. 1, a common buffer 168 may be connected to the demodulator 160. The common buffer 168 may be also considered a shared buffer. Moreover, the common buffer 168 may be a memory from which one or more elements, described below, read data. As shown, the demodulator 160 may transmit data into the common buffer 168. For example, the demodulator 160 may transmit a first MAC header 170 into the common buffer 168. Thereafter, the demodulator 160 may transmit a first transport header 172 into the common buffer 168. Moreover, the demodulator 160 may transmit a first coded video data segment 174 into the common buffer 168. Additionally, the demodulator 160 may transmit an Nth MAC header 176 into the common buffer 168. Following, the Nth MAC header 176, the demodulator 160 may transmit an Nth transport header 178 into the common buffer 168. Thereafter, the demodulator 160 may transmit an Nth coded video data segment 180 into the common buffer 168 after the Nth transport header 178. In a particular aspect, the data within the common buffer 168 of the client system 104 corresponds to the data within the common buffer 126 of the host system 102. For example, the client device 104 may be adapted to allocate contiguous locations (e.g., predetermined locations) of the common buffer 168 in which to store (e.g., write) the first MAC header 170, first transport header 172 and first coded video data segment 174 and to store such data in the contiguous locations of the common buffer 168. Similarly, the client device 104 may be adapted to allocate contiguous locations of the common buffer 168 in which to store the Nth MAC header 176, Nth transport header 178 and Nth coded video data segment 180 and to store such data in the contiguous locations of the common buffer 168. The locations may be allocated based on a predetermined channel bandwidth and packet error rate (PER).

FIG. 1 depicts a WD MAC protocol unit 182 may be connected to the common buffer 168. A WD transport parser 184 may be connected to the WD MAC protocol unit 182 and the common buffer 168. Further, a WD video decoder 186 may he connected to the WD transport parser 184 and the common buffer 168. In a particular aspect, the WD MAC protocol unit 182 may read the first MAC header 170 from the common buffer 168. Thereafter, the WD transport parser 184 may read the first transport header 172 from the common buffer 168. Moreover, the WD video decoder 186 may read the first coded video data segment 174 from the common buffer 168. Additionally, the WD MAC protocol unit 182 may read the Nth MAC header 176 from the common buffer 168. Following, the Nth MAC header 176, the WD transport parser 184 may read the Nth transport header 178 from the common buffer 168. Thereafter, the WD video decoder 186 may read the Nth coded video data segment 180 from the common buffer 168 after the Nth transport header 178.

As indicated in FIG. 1, a reconstructed picture buffer 188 may be connected to the WD video decoder 186. Further, a display processor 190 may be connected to the reconstructed picture buffer 188. A display buffer 192 may be connected to the display processor 190. An external display 194 may he connected to the display buffer 192.

In a particular aspect, the WD MAC protocol unit 182 may include a memory management unit 196. The WD transport parser 184 may also include a memory management unit 198. Further, the WD video decoder 186 may include a memory management unit 199. In this aspect, the memory management units 196, 198, 199 may be used to map the physical address locations and pointers from the common buffer 168 into contiguous virtual address space for each of these components.

In a particular aspect, a composited image is an image to he rendered for a simple extension to the external display 194. The composited image may be the input to the WD system, i.e., elements 120 through 182 and elements therein. Wireless extensions, such as HDMI, USB, RUB, or a combination thereof, may provide a relatively simple manner of carriage of the appropriate encapsulated data over a wireless protocol.

In the wireless display (WD) chain, described above, the common buffer 126 may he configured to accommodate encoded data received from the WD video encoder 120, transport headers for encapsulation of the coded data and the MAC protocol headers for outer coding from the WD MAC protocol unit 124. Depending on one or more of the required channel bandwidth, PER and latency (e.g., desired latency), the video packet size, the transport header characteristics and the corresponding length, and/or outer coding rate and corresponding MAC header length may be calculated. The appropriate memory addresses for the MAC header followed by transport header followed by the video packet may be allocated for length based on those calculations. The WD video encoder 120 may directly write coded video data in the assigned areas of the common buffer 126 concurrently, which fragments the coded data on the fly and eliminates the need for separate buffers at the transport and MAC layers where fragmentation of data/bitstream in video packets occurs. The WD transport encapsulator 122 may obtain metadata such as NALU length/start and end points in the buffer from the video encoder and may prepare the headers for the coded video data segments. The WD MAC protocol unit may create the parity data for the coded video data segments and insert the parity data at the end of the coded video data segments 132, 138.

In a particular aspect, the latency of the wireless display system 100 may be measured from the output of the display processor, i.e., the scaler/frame interpolator 112, of the host system 102 to the input of the display buffer 192 on the external display 194 of the client system 104. This delay is indicated as DelayWD in FIG. 1. The encoding delay may be minimized through the appropriate number of slices per frame based on the resolution and the frame rate. Table 1, below, indicates slice structures, coding overheads, and encoding latencies for various resolutions and frame rates.

TABLE 1

Slice Structure, Coding Overhead and Encoding Latency for Various Resolutions and Frame Rates.

|  | Rows | Columns | Frame Rate (fps) | # MB's/ Row | # MB's/ Col | Total # MB's | # MB's/ ms | #MB rows/ ms | # Slices/ frm | % Coding Over- head* | Latency (ms) |
|---|---|---|---|---|---|---|---|---|---|---|---|
| VGA@30 | 640 | 480 | 30 | 40 | 30 | 1200 | 36 | 0.9 | 1 | 30 | 20 | 1.11 |
| SD@30 | 720 | 480 | 30 | 45 | 30 | 1350 | 40.5 | 0.9 | 1 | 30 | 20 | 1.11 |
| WVGA@30 | 800 | 480 | 30 | 50 | 30 | 1500 | 45 | 0.9 | 1 | 30 | 20 | 1.11 |
| 720p30 | 1280 | 720 | 30 | 80 | 45 | 3600 | 108 | 1.35 | 1 | 45 | 25 | 0.74 |
| 720p60 | 1280 | 720 | 60 | 80 | 45 | 3600 | 216 | 2.7 | 1 | 45 | 25 | 0.37 |
| 1080p/i@30 | 1920 | 1088 | 30 | 120 | 68 | 8160 | 244.8 | 2.04 | 2 | 34 | 22 | 0.49 |
| 1080p@60 | 1920 | 1088 | 60 | 120 | 68 | 8160 | 489.6 | 4.08 | 2 | 34 | 22 | 0.25 |

Table 1 indicates various resolutions. Further, for example, the Table 1 indicates that encoding one (1) macroblock (MB) row as one slice may minimize the encoding latency to 33 ms/30=1.11 ms. The coding overhead to encode a frame into multiple slices is shown in the second-to-last column. Since lower latency and higher quality is more important than compression efficiency, an overhead of 20-25% may be accommodated in the large bandwidths support by a wireless display physical layer (PHY). For example, VGA @ 30 fps requires 2 Mbps for a good quality compression. Further, up to 5 Mbps may be supported in ultra-wide band transmission (UWB). In addition, the use of multiple slices may improve error resilience and may enable unequal error protection by using higher outer/inner code rates for intra-frame slices (I-slices) versus predicted frame slices (P-slices) within a frame, especially in conjunction with intra-refresh.

In a particular aspect, the interleaving depth may be managed based on the PDU/MTU size and channel error requirements. For example, a size of 1K bits to a maximum of 4K bits per inner code packet may reduce delay introduced in interleaving and may provide sufficient time diversity and error protection. The packet lengths may be large enough for effective turbo coding or even low density parity check (LDPC) coding. Data rates, or throughput, of 5 Mbps to 400 Mbps may be provided on WPAN networks used as wireless links for wireless displays. For a bitrate of 5 Mbps, at inner code lengths of 1K bits, the interleaving latency is 1/5000=0.2 ms. This may be considered the worst case latency for the present system. Moreover, for 20 Mbps, the latency may drop to 0.05 ms. For HD resolutions, inner code lengths of 4Kbits may be used and the latency for 50 Mbps for 1080p60 may drop to 4/50,000, or 0.08 ms. Accordingly, a maximum interleaving latency of 0.2 ms may be provided by the present system. RF propagation delays may be less than 200 microseconds. Maximum RF propagation delays may be 500-600 ns of propagation delay plus 75 microseconds of multipath delay due to rms delay spread.

In a particular aspect, the WD video decoder 186 does not have to wait for an entire slice to be received before start of decoding. As such, the decoding latency may be less than the encoding latency, i.e., the maximum encoding latency of 1.11 ms. The display processor in the external display may introduce an additional latency based on the number of pixel lines of image are required for post-processing. Typically, this is 16 lines corresponding to 1 row of MBs. Hence, an additional latency of 1.11 ms may be possible. This includes partial updates for rendering. The latencies for the entire wireless display system 100 are summarized in Table 2, below.

TABLE 2

Summary of Latencies for the Wireless Display System.

| Processing Component | Latency (ms) |
|---|---|
| Encoding Latency | 1.11 |
| Tx Interleaving Latency | 0.2 |
| Rx Interleaving Latency | 0.2 |
| Decoding Latency (utmost) | 1.11 |
| Display processing | 1.11 |
| Total | 3.73 |

The common buffer architecture described herein substantially eliminates data transfers and as such, memory bandwidth requirements are substantially reduced. Accordingly, power consumption is also substantially reduced. Additionally, physical memory space is substantially reduced. Latencies are also substantially reduced since the WD video encoder 120, the WD transport encapsulator 122, and the WD MAC protocol unit 124 may be tightly coupled through pipelined processing. The delay on the transmit chain may be reduced to the encoding delay plus the interleaving delay within the modulator 140.

In a particular aspect, the WD video encoder 120, the WD transport encapsulator 122, the WD MAC protocol unit 124, the WD MAC protocol unit 182, the W U transport parser 184, the WD video decoder 186, or a combination thereof may act as means for executing one or more of the method steps described herein.

Figure 2:
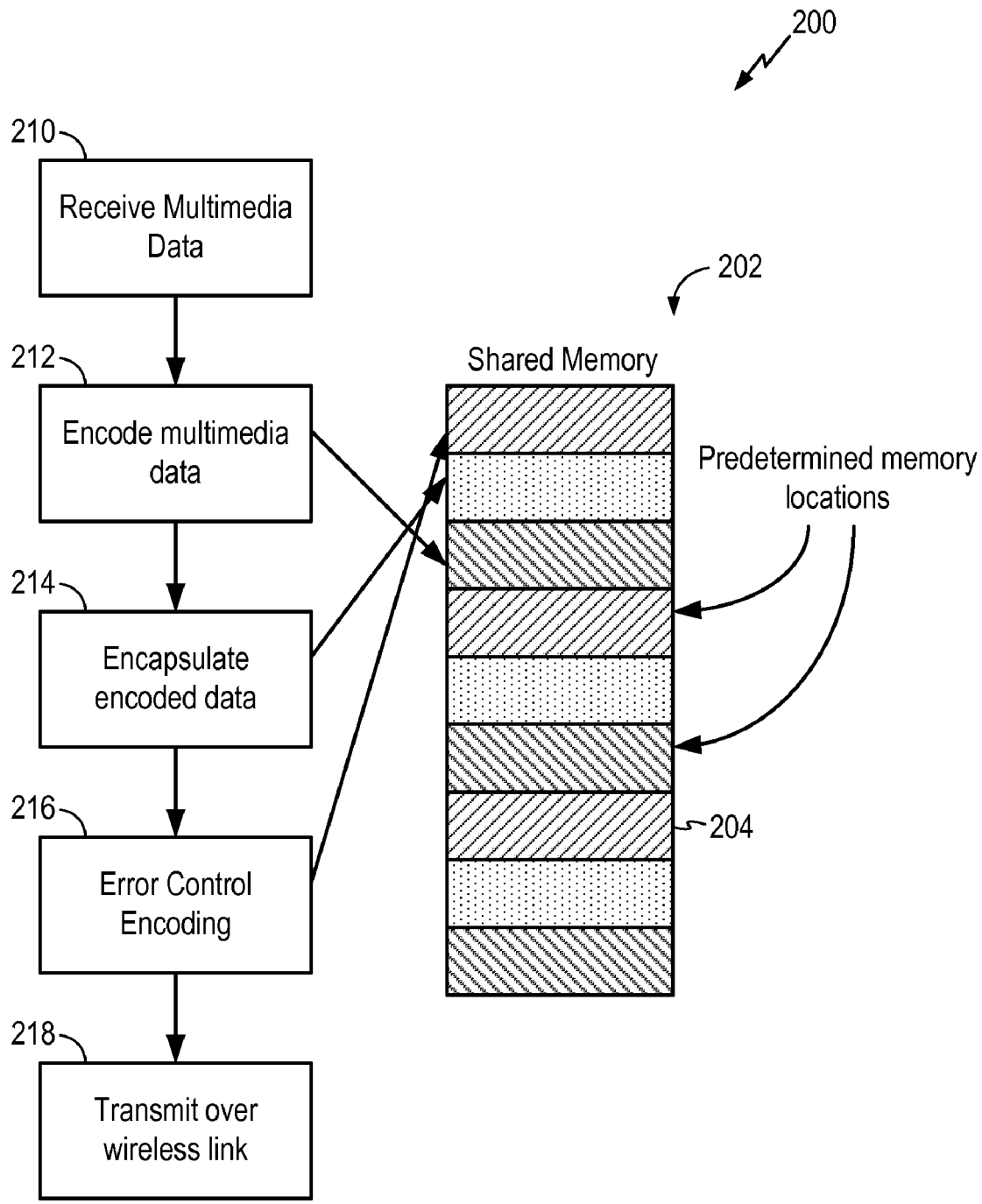
FIG. 2 is a flowchart illustrating a general method of processing multimedia data within a wireless device.

Referring to FIG. 2, a general method of processing multimedia data within a wireless device is shown and is generally designated 200. For clarity, the method 200 is described in conjunction with a shared memory 202 having a plurality of predetermined memory locations 204.

Commencing at block 210, multimedia data may be received, e.g., within a WD host application. At block 212, the multimedia data may be encoded and written into a predetermined memory location, e.g., by a WD video encoder. At block 214, the encoded data may encapsulated and written into another predetermined memory location, e.g., by a WD transport encapsulator. In a particular aspect, the encapsulated encoded data may be written into the shared memory in a memory location after the encoded multimedia data.

Moving to block 216, error control encoding may be created and written into yet another predetermined memory location, e.g., by a WD MAC protocol unit. The error control encoding may be written into the shared memory in a memory location after the encapsulated encoded data. At block 218, the data may be transmitted over a wireless link. In a particular aspect, the data may be transmitted in the following order: encoded multimedia data, encapsulated encoded data, and error control encoding. After block 218, the method may end.

Figure 3:
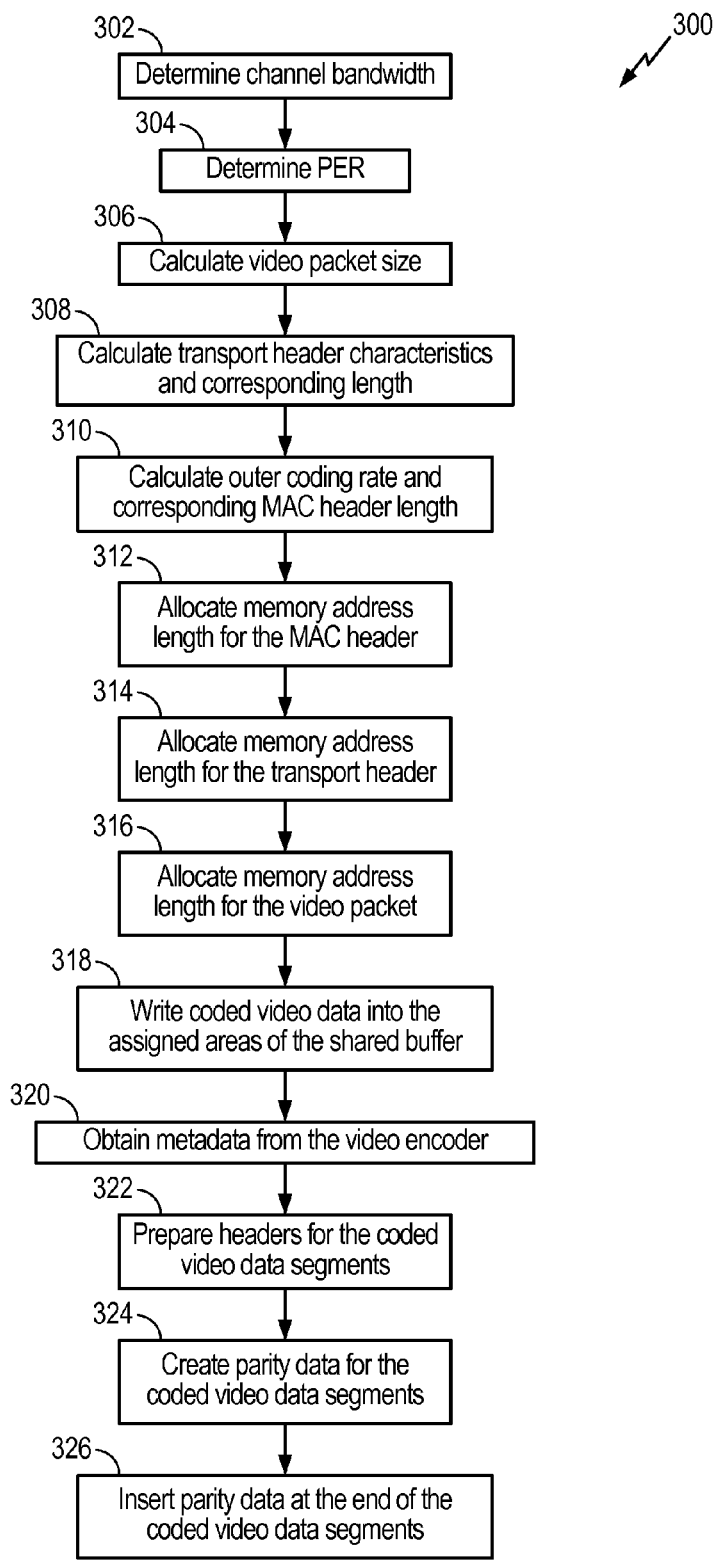
FIG. 3 is a flowchart illustrating a detailed method of processing multimedia data within a wireless device.

FIG. 3 illustrates a detailed method of processing multimedia data within a wireless device. The method is generally designated 300. Commencing at block 302, a channel bandwidth may be determined. At block 304, a packet error rate (PER) may be determined. Further, at block 306, a video packet size may be calculated. Moving to block 308, transport header characteristics and corresponding length may be calculated. At block 310, an outer coding rate and a corresponding MAC header length may be calculated. In a particular aspect, the video packet size, the transport header characteristics and corresponding length, and the outer coding rate and the corresponding MAC header length may be calculated at least partially based on the packet error rate and the channel bandwidth.

Moreover, at block 312, a memory address length for the MAC header may be allocated. At block 314, a memory address length for the transport header may be allocated. Further, at block 316, a memory address length for the video packet may be allocated.

At block 318, coded video data may be written into the assigned areas of a shared memory buffer. Thereafter, at block 320, metadata from a video encoder may be obtained. At block 322, headers for the coded video data segments may be prepared. Further, at block 324, parity data for the coded video data segments may be created. At block 326, the parity data may be inserted at the end of the coded video data segments. The method may then end.

Figure 4:
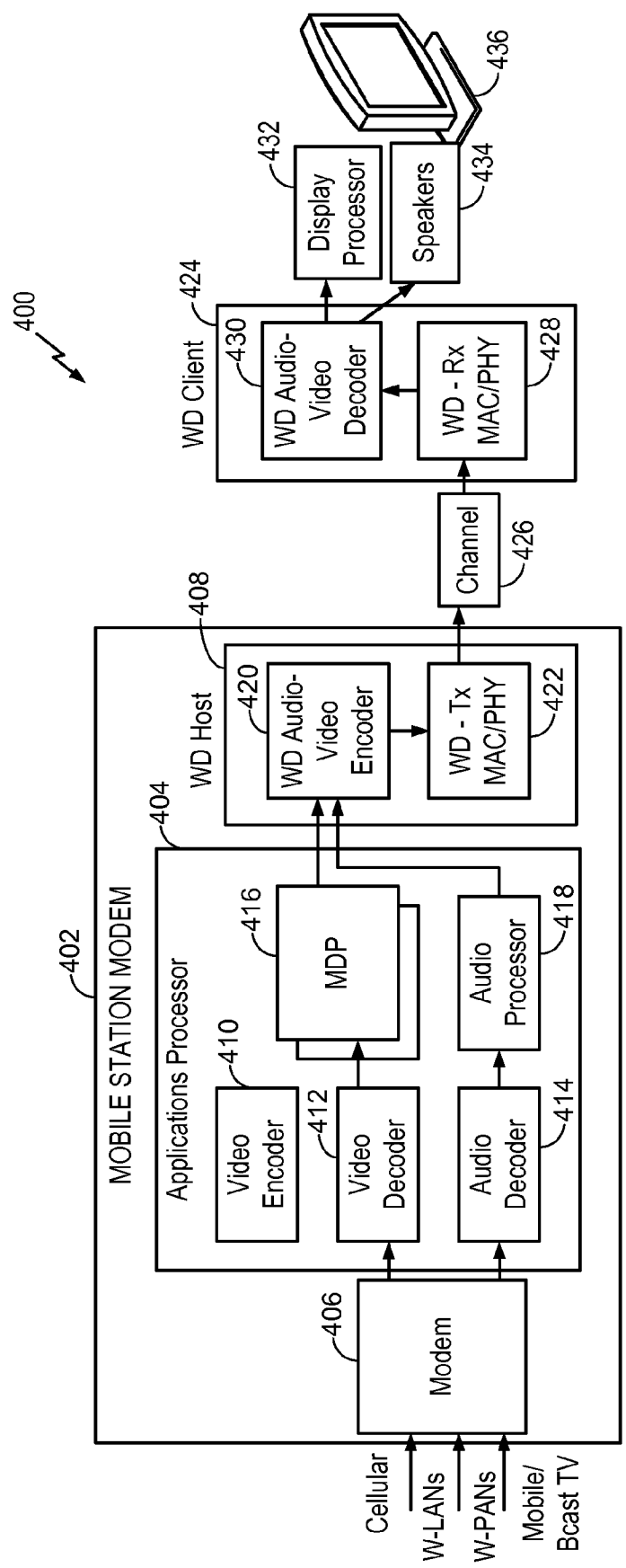
FIG. 4 is a diagram of a second aspect of a wireless display system.

FIG. 4 illustrates a second aspect of a wireless display system, generally designated 400. As shown, the wireless display system 400 may include a mobile station modem 402. The mobile station modem 402 may include an applications processor 404. A modem 406 may be connected to the applications processor 404. Further, a WD host device 408 may be coupled to the applications processor 404.

In a particular aspect, the applications processor 404 may include a video encoder 410, a video decoder 412, and an audio decoder 414. The video decoder 412 and the audio decoder 414 may be connected to the modem 406. The applications processor 404 may also include a display processor 416, e.g., a mobile display processor (MDP), that may be coupled to the video decoder 412. Additionally, the applications processor 404 may include an audio processor 418. The audio processor 418 may be connected to the audio decoder 414.

As depicted, the WD host device 408 may include a WD audio-video encoder 420. The WD audio-video encoder 420 may be connected to the Display processor 416 and the audio processor 41.8 within the applications processor 404. The WD host device 408 within the mobile station modem 402 may also include a WD transmitter 422. In particular, the WD transmitter 422 may include a MAC layer and a PHY layer.

As further indicated in FIG. 4, the wireless display system 400 may further include a WD client 424 connected to mobile station modem 402 via a wireless channel 426. Specifically, the channel 426 is connected to the WD transmitter 422 within the WD host 408. Further, the channel 426 is connected to a WD receiver 428 within the WD client 424. The WD receiver 424 may include a MAC layer and a PHY layer. FIG. 4 also indicates that the WD client 424 may include a WD audio-video decoder 430 connected to the WD receiver 428. The WD audio-video decoder 430 may be connected to a display processor 432 and one or more speakers 434. The display processor 432 may be connected to a display 436.

In the wireless display system 400, multimedia data may be received at the mobile station modem 402, e.g., via the modem 406, over a radio network. For example, the radio network may be a cellular network such as third generation CDMA (3G COMA), (1x/UMTS), GSM (GPRS/EDGE), or a combination thereof. Further, the radio network may be a broadcast network such as terrestrial digital television (DTV), ISDB-T, S-DMR, Mobile TV, or a combination thereof. The radio network may he a wireless local area network (WLAN) such as 802.11b/g/n, WiFi, or a combination thereof. In another aspect, the radio network may be a wireless personal area network (WPAN) such as USB/W-USB. In yet another aspect, the radio network may be a WBAN, such as BT, near field communications (NFC) for applications that may include conversational video, e.g., video telephony and video conferencing, or a combination thereof. The radio network may also be a video on demand (VOD) network that may include pseudo-streaming or streaming video, Internet protocol television (IPTV), internet video, or a combination thereof. The multimedia data may be received via a stored medium or the multimedia data may be live streaming content such as that provided by broadcast, e.g., DTV, mobile TV, or a combination thereof Multimedia data may also be received in uncompressed format via image/video sensors for camera/camcorder applications.

In a particular aspect, the WD host 408 may he configured as an application within the mobile station modem 402. The WD host 408 may call the audio decoder 414, the video decoder 412, the display processor 416, or a combination thereof for any audio/visual (AV) processing needs. The WD host 408 may run on a central processing unit (CPU), e.g., within the application processor 404 of the mobile station modem 402. Further, the WD host 408 may also configure an available W-PAN modem to act as a wireless display modem.

Figure 5:
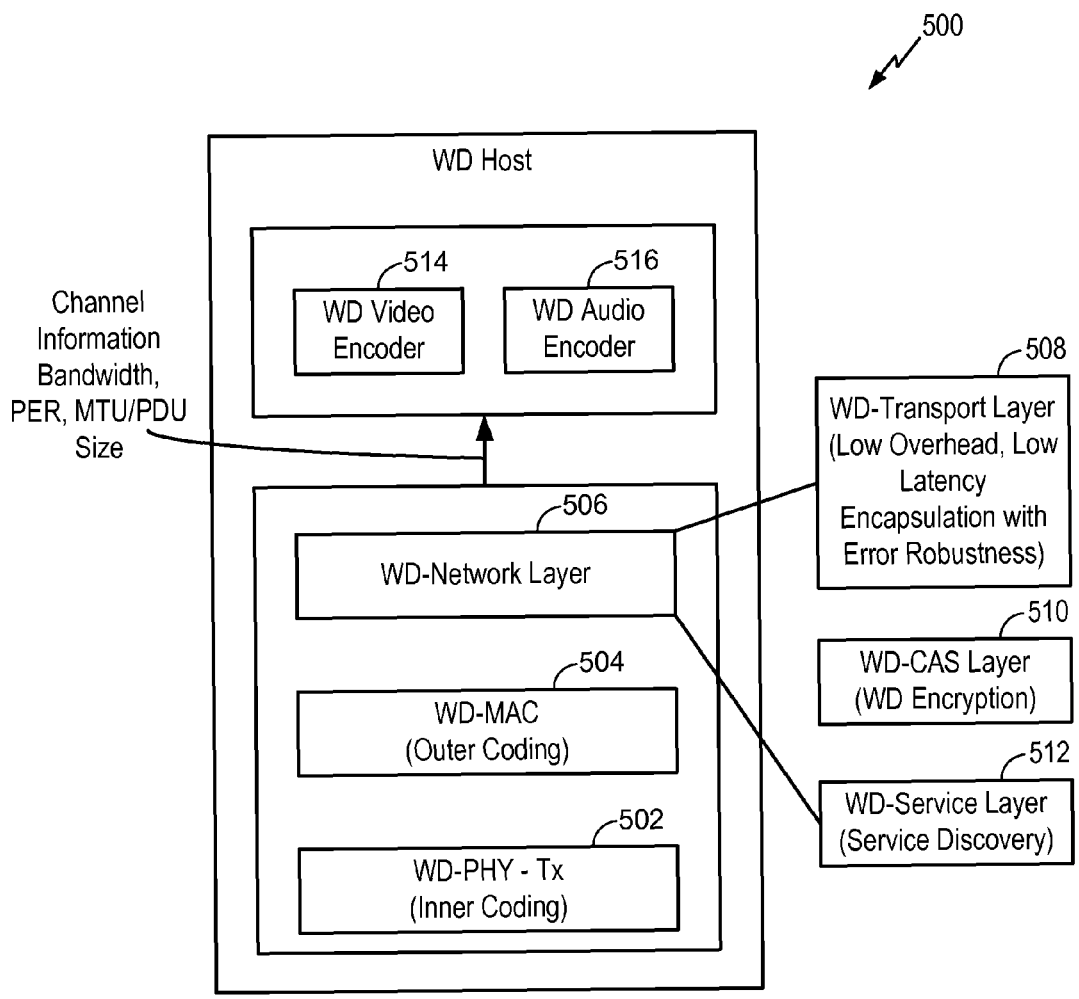
FIG. 5 is a diagram of a wireless device bust.

Referring now to FIG. 5, an exemplary, non-limiting aspect of a WD host is shown and is generally designated 500. As shown, the WD host 500 may include a WD PHY layer 502. The WD PHY layer 502 may include a transmitter. Further, the WD PHY layer 502 may provide inner coding to the video data. The WD host 500 may also include a WD MAC layer 504. In a particular aspect, the WD MAC layer 504 may provide outer coding to the video data. Also, the WD PHY layer 502 and the WD MAC layer 504 may operate as described elsewhere herein.

Further, as shown, the WD host 500 may include a WD network layer 506. The WD network layer 506 may include a WD transport layer 508, a WD CAS layer 510, and a WD service layer 512. In a particular aspect, the WD transport layer 508 may operate as described elsewhere herein. The WD GAS layer 510 may provide encryption to WD coded data segments. The encryption may be optional and an additional delay, or latency, may be incurred depending on the complexity of the encryption algorithm used. Since compression may provide a higher level of security than uncompressed data, a simple scrambling algorithm may be utilized in order minimize latency incurred due to the encryption.

As indicated in FIG. 5, the WD service layer 512 may provide service discovery. Service discovery may occur during the initialization of a WPAN link for a wireless device (WD). Service discovery may also occur when any service contention occurs over ultra wide band (UWB) since UWB is typically an unlicensed band. In a particular aspect, service discovery may not introduce any noticeable latency during transmission from the wireless device to a wireless display.

FIG. 5 further indicates that the WD host 500 may also include a WD video encoder 514 and a WD audio encoder 516 that may be connected to each other and to the WD network layer 506, the WD MAC layer 504, and the WD PHY layer 502. The WD video encoder 514 and the WD audio encoder 516 may operate as described elsewhere herein.

In a particular aspect, channel information may he provided to the WD video encoder 514 and the WD video encoder 514 may use the channel information to select appropriate values for rate control parameters, rate adaption parameters, error resilience parameters, or a combination thereof. The channel information may include available bandwidth for data transmission, expected PER, MTU/PDU size of the PHY layer, or a combination thereof. The available bandwidth may be a value that accounts for overhead due to outer coding, inner coding, or a combination thereof. The PER may be determined at least partially based on a signal-to-noise ratio (SNR).

In a particular aspect, a WD transport protocol provided by the WD transport layer 508 may be an existing protocol that includes one or more error robustness features. Alternatively, the WD transport protocol provided by the WD transport layer 508 may include a new protocol specifically designed for low latency.

Figure 6:
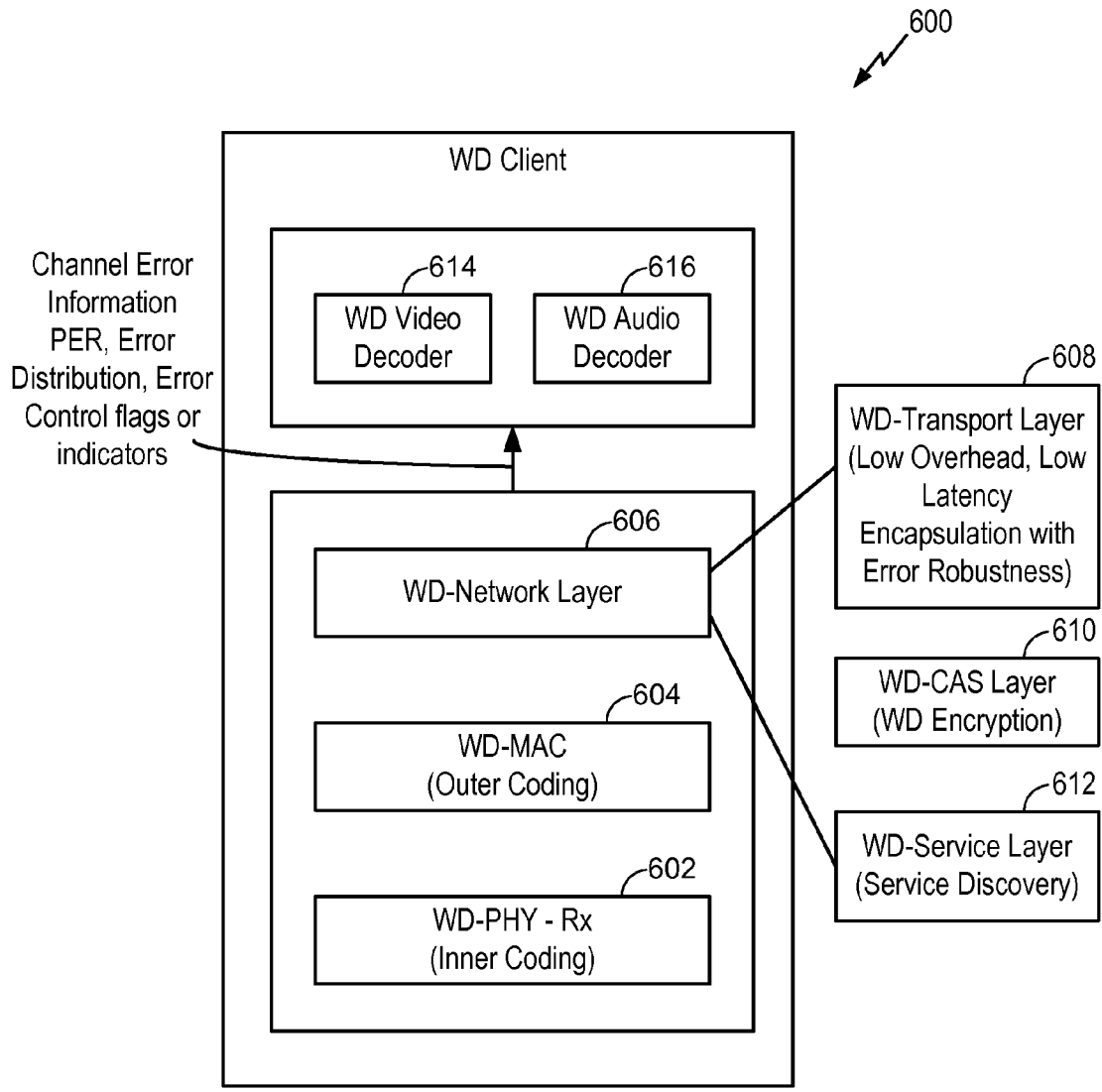
FIG. 6 is a diagram of a wireless device client.

Referring to FIG. 6, an exemplary, non-limiting aspect of a WD client is shown and is generally designated 600. As shown, the WD client 600 may include a WD PHY layer 602. The WD PHY layer 602 may include a receiver. Further, the WD PHY layer 602 may provide inner coding to the video data. The WD client 600 may also include a WD MAC layer 604. In a particular aspect, the WD MAC layer 604 may provide outer coding to the video data. Also, the WD PHY layer 602 and the WD MAC layer 604 may operate as described elsewhere herein.

As shown, the WD client 600 may include a WD PHY layer 602. The WD PHY layer 602 may include a receiver. Further, the WD PHY layer 602 may provide inner coding to the video data. The WD client 600 may also include a WD MAC layer 604. In a particular aspect, the WD MAC layer 604 may provide outer coding to the video data. Also, the WD PHY layer 602 and the WD MAC layer 604 may operate similar to the WD PHY layer 502 and the WD MAC layer 504 described in conjunction with FIG. 5.

As shown, the WD client 600 may include a WD network layer 606. The WD network layer 606 may include a WD transport layer 608, a WD CAS layer 610, and a WD service layer 612. In a particular aspect, the WD transport layer 608 may operate similar to the WD transport layer 508 described in conjunction with FIG. 5. The WD CAS layer 610 may provide encryption to WD coded data segments. The WD service layer 612 may provide service discovery.

FIG. 6 further indicates that the WD client 600 may also include a WD video decoder 614 and a WD audio decoder 616 that may be connected to each other and to the WD network layer 606, the WD MAC layer 604, and the WD PHY layer 602.

In a particular aspect, channel error information may be provided to the WD video decoder 614 and the WD video decoder 614 may apply the channel error information to error detection, recovery, concealment, or a combination thereof. The channel error information may include PER, error distribution, error control flags, or a combination thereof. The PER may include an instantaneous PER, an average PER, a burst length, or a combination thereof. The error control flags may be inserted into the coded data in the form of user defined slices, e.g., SEI, to indicate a start of an error, a length of an error, or a combination thereof.

The WD client 600 may be an application that runs on a WD receiver that may be hosted on a MSM or a dedicated client application on a processor within a WD receiver modem. The WD client. 600 may utilize display processing functionality, e.g., a video decoding engine available within an external display.

Figure 7:
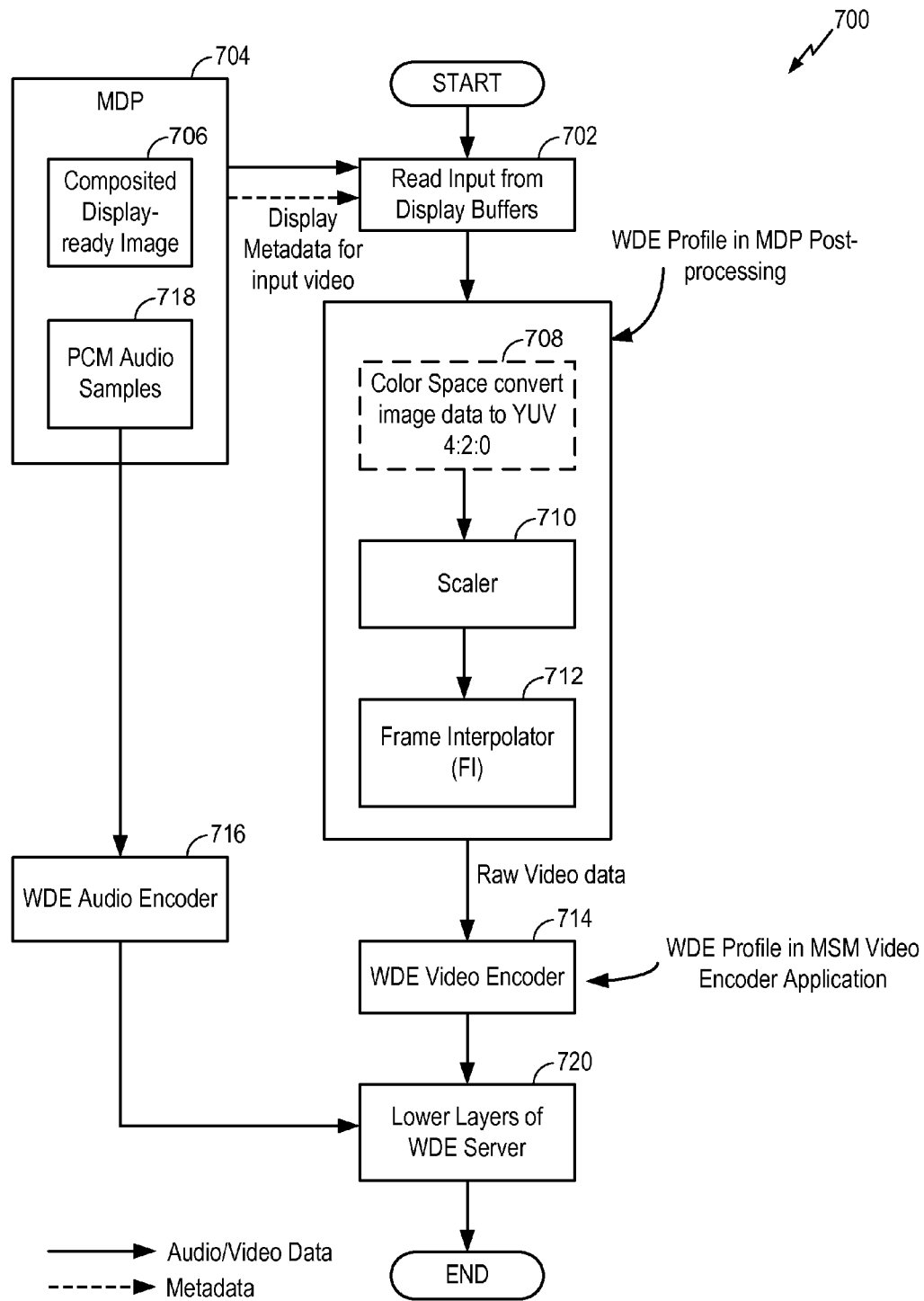
FIG. 7 is a flowchart illustrating a method of processing video data at a wireless device host.

FIG. 7 illustrates a method of processing video data at a WD Host, e.g., the WD host described above in conjunction with FIG. 5. The method is generally designated 700. In a particular aspect, the method illustrated in FIG. 7 may be used to process video data having a resolution less than VGA and a frame rate of less than thirty frames per second (30 fps). Commencing at block 702, input may be read from one or more display buffers. The input may come from a mobile display processor (MDP) 704. Further, the input may include a composited display-ready image 706 from the MDP 704 and display metadata for the input video.

After the input is read at from the display buffers at block 702, the method may proceed to block 708 and a color space conversion may be performed. Specifically, the image data may be converted to a YUV format, e.g., YUV 4:2:0. At block 710, a scaler routine may be performed. Further, at block 712, a frame interpolator (FI) routine may be performed. The scaler routine and the frame interpolator routine are described below in conjunction with FIG. 8.

Returning to the description of the method 700, after the scaler and frame interpolation routine (SFR) is performed, the method may continue to block 714 and a WDE video encoder may encode the video data. At the same time at block 716, a WDE audio encoder may encode audio data, e.g., PCM audio samples 718, from the MDP 704. From block 714 and block 716, the method may proceed to block 720 and the video data may be processed in the lower layers of the WD host. Thereafter, the method may end.

Figure 8:
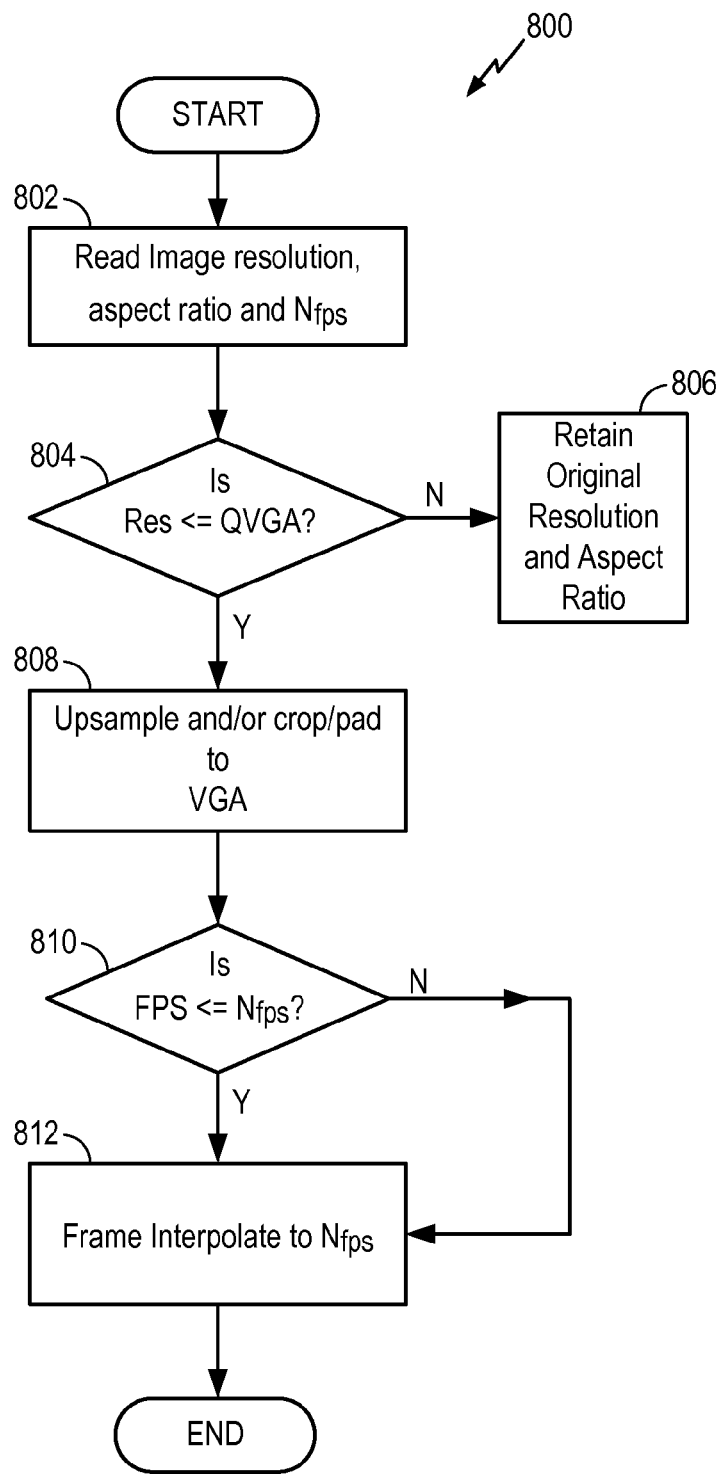
FIG. 8 is a flowchart illustrating a scaler and frame interpolation routine.

Referring to FIG. 8, a scaler and frame interpolation routine (SFR), designated 800, is shown. The scaler and frame interpolation may be the scaler and frame interpolation routine described in conjunction with FIG. 7.

Commencing at block 802, the image resolution, the aspect ratio, the native frame rate (Nfps), or a combination thereof may be read. In a particular aspect, the native frame rate, may be twenty-four frames per second (24 fps), twenty-five frames per second (25 fps), or thirty frames per second (30 fps). Further, in a particular aspect, the native frame rate may be determined from deinterlace and inverse telecine detection logic in the MDP, described above.

Returning to the description of the method 800, at decision step 804, the WD host may determine whether the resolution, Res, is less than or equal to QVGA. If not, the method 800 may proceed to block 806 and the WD host may retain the original resolution and aspect ratio. Thereafter, the method may end. If the resolution is less than or equal to QVGA, the method 800 may continue to block 808 and the video data, i.e., each image thereof, may be upsampled, cropped, padded, or a combination thereof to a resolution corresponding to VGA.

Moving to decision step 810, the WD host may determine if the frame rate, FPS, is less than or equal to the native frame rate. If not, the method may end. Otherwise, if the frame rate is less than or equal to the native frame rate, the method may proceed to block 812 and the WD host may perform frame interpolation in order to interpolate the frame rate to the native frame rate. Thereafter, the method 800 may end.

In a particular aspect, the MDP may be configured for VGA or higher resolution output. Or, the MDP may be configured for a default resolution, frame rate, and refresh rate for 7K and above. In another aspect, the scaler and frame interpolation routine may be executed as part of a WD profile in the MD? and the scaler and frame interpolation functions may be performed within the MDP. In still another aspect, the scaler and frame interpolation routine may be executed within the WD host and the scaler and frame interpolation functions may be performed within the WD host.

Figure 9:
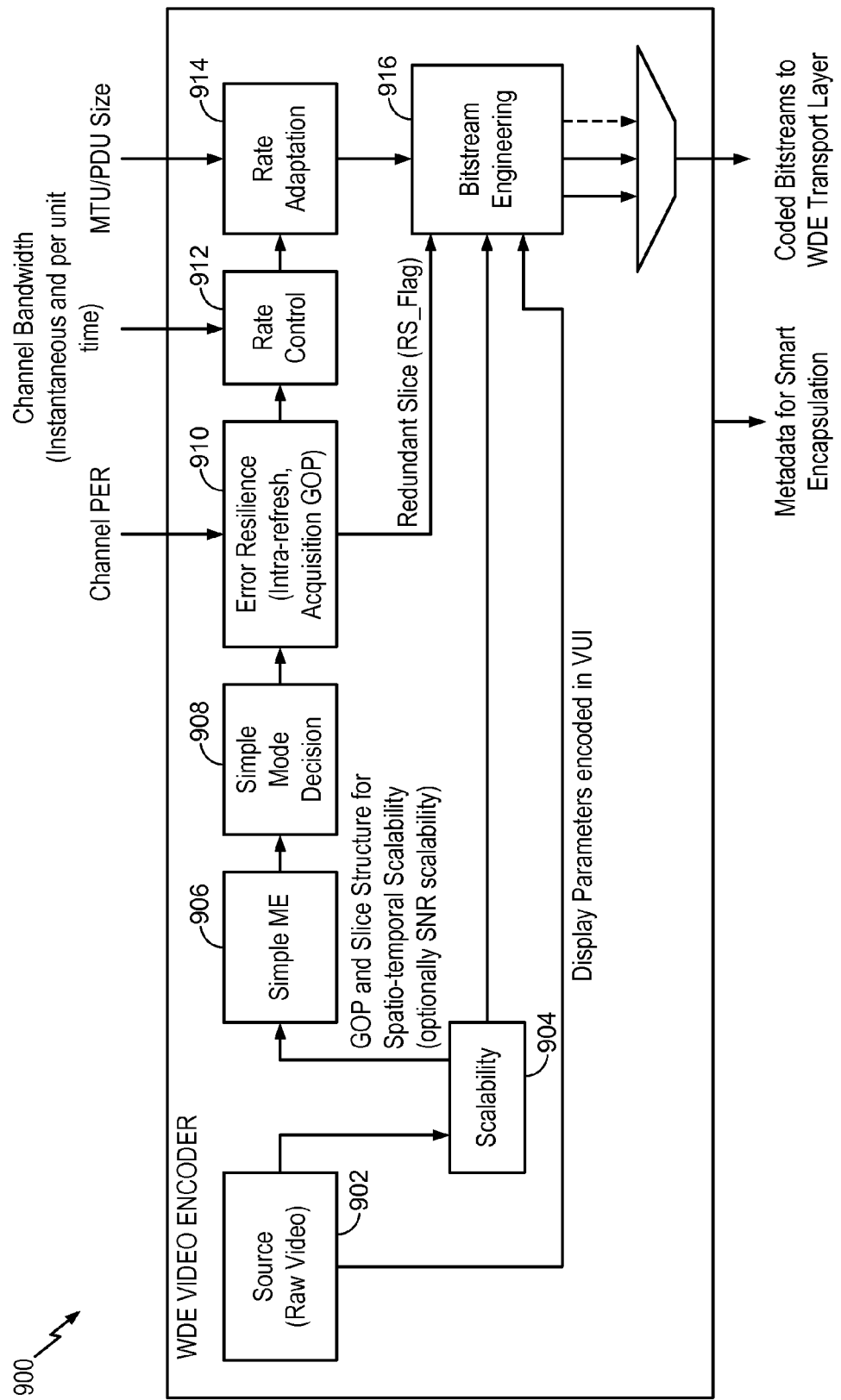
FIG. 9 is a diagram of a wireless device video encoder.

Referring to FIG. 9, a WD video encoder is shown and is generally designated 900. As illustrated, the WD video encoder 900 may include a source 902. The source 902 may provide raw video to one or more downstream components within the WD video encoder 900. A scalability module 904 may be connected to the source 902. A simple maximum entropy (ME) module 906 may be connected to the scalability module 904. Further, a simple mode decision module 908 may be connected to the simple ME module 906 and an error resilience module 910 may be connected to the simple mode decision module 908.

As further shown in FIG. 9, a rate control module 912 may be connected to the error resilience module 910. A rate adaption module 914 may be connected to the rate control module 912. Additionally, a bitstream engineering module 916 may be connected to the source 902, the scalability module 904, the error resilience module 910, and the rate adaption module 914.

In a particular aspect, the simple ME module 906 may not include any B-slices in order to provide low latency encoding. The simple ME module 906 may utilize a single reference picture for simplified buffer management, error resilience, error recovery, or a combination thereof. Also, the simple ME module 906 may provide a motion search that is optimized with cache for fixed search range, e.g., ±64, and pixel reads.

The simple mode decision module 908 may utilize intra-frames and inter-frames. For intra-frames, a 16×16 mode may be used. Further, an 8×8 mode may be used. Also, a 4×4 mode may be used. In a particular aspect, the simple mode decision module 908 may not utilize rectangular modes or planar modes. The simple mode decision module 908 may utilize tour simple 4×4 modes out of 9 modes. Inter-frames may be used for early, high accuracy skip detection. Also, inter-frames may be used for relatively fast encoding and decoding in order to achieve relatively low latency. In a particular aspect, parts, or all, of P-frames in a temporal enhancement layer may be dropped to match video bitrate with instantaneous channel bandwidth to accommodate higher FEC, i.e., outer and inner coding rate, to mitigate deep fades or loss of channel bandwidth to higher priority service in UWD.

FIG. 9 illustrates that a channel PER may be input, or otherwise provided, to the error resilience module 910 within the WD video encoder 900. Channel bandwidth may be input, or otherwise provided, to the rate control module 912. The channel bandwidth may he an instantaneous value, a per unit time value, or a combination thereof. Further, a MTU/PDU size may be input, or otherwise provided, to the rate adaption module 914. The WD video encoder 900 may output metadata for smart encapsulation, e.g., a scalable bitstream structure for on-the-fly bitrate adaption to channel bandwidth. Further, the WD video encoder 900 may output coded bit-streams to a WD transport layer.

In a particular aspect, the WD video encoder 900 may perform a light weight or low complexity compression and the WD video encoder 900 may achieve compression ratios of 5:1 to 25:1. In a particular aspect, resolutions and frame rate from VGA @ 30 fps to 1080p60 may be coded at bitrates from 4 Mbps to 300 Mbps, i.e., the range of data throughput for UWB. The WD video encoder 900 may provide visually lossless compression for high image quality. Any compromises in quality may result in a poor user experience. Low complexity encoding may be utilized in order to reduce power consumption. Relatively complicated predictions may not be used given the moderate compression ratio requirements. Low latency encoding may be achieved using multiple slices/frame with or without control of slice size (#bytes/slice) as described earlier.

In a particular aspect, error resilience may be achieved by using selective refresh in order to minimize hiccups in transmission and to maintain a transparent user experience. Given light compression, slice or picture redundancies and intra refreshes yield a more seamless recovery than macroblock (MB) refresh. As such, depending on the channel PER and random access needs, a redundant slice (intra coded) may be introduced at periodic intervals. It may be appreciated that even when large bandwidths are available, such as in millimeter-wave bands, uncompressed video may not be resilient to errors compared to lightly compressed, but resilient video. For example, by adding appropriate redundancy with loss in compression, intra frames may have orders of magnitude higher entropy compared to subsequent P-frames. Also, an increase in group of pictures (GOP) length, but suitably multiplexed, in a redundant intra frame may be used for error recovery when primary intra frame is corrupted.

Figure 10:
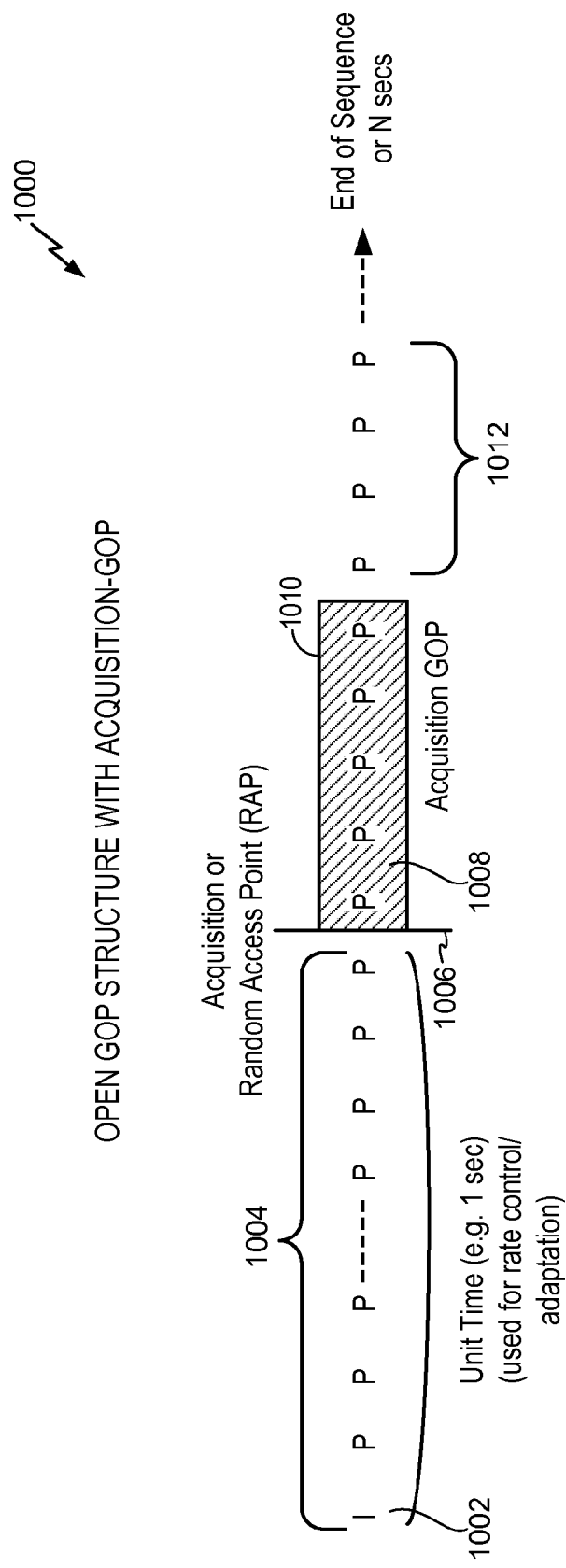
FIG. 10 is an exemplary group of pictures (GOP) structure.

Referring now to FIG. 10, a GOP structure for error resilience and acquisition is shown and is generally designated 1000. The GOP structure 1000 may be utilized by the error resilience module 910 within the WD video encoder 900. As shown, the GOP structure 1000 includes an i-frame 1002 followed by a series of p-frames 1004 that terminate at a random access point (RAP) 1006, aka, an acquisition point. A unit of time, e.g., one second, may elapse from the i-frame 1002 to the RAP 1006. An acquisition GOP 1008 may follow the acquisition point 1006. The acquisition GOP 1008 may include a plurality of p-frames 1010. The acquisition GOP 1008 may be followed by a series of p-frames 1012 that may end after a number, N, of seconds. N indicates the end of the sequence.

Returning to the description of the WD video encoder 900, the rate control module 912 within the WD video encoder 900 may perform a constant bitrate (CBR) type operation to minimize delays that may be introduced due to sharp fluctuations in instantaneous bitrate. The rate adaption module 914 may perform rate adaption in order to fit the slices into the pre-assigned address space within the common buffer, described above. The size in the buffer may be based on the MTU/PDU sizes determined during service discovery, initialization, channel contention, or a combination thereof.

Figure 11:
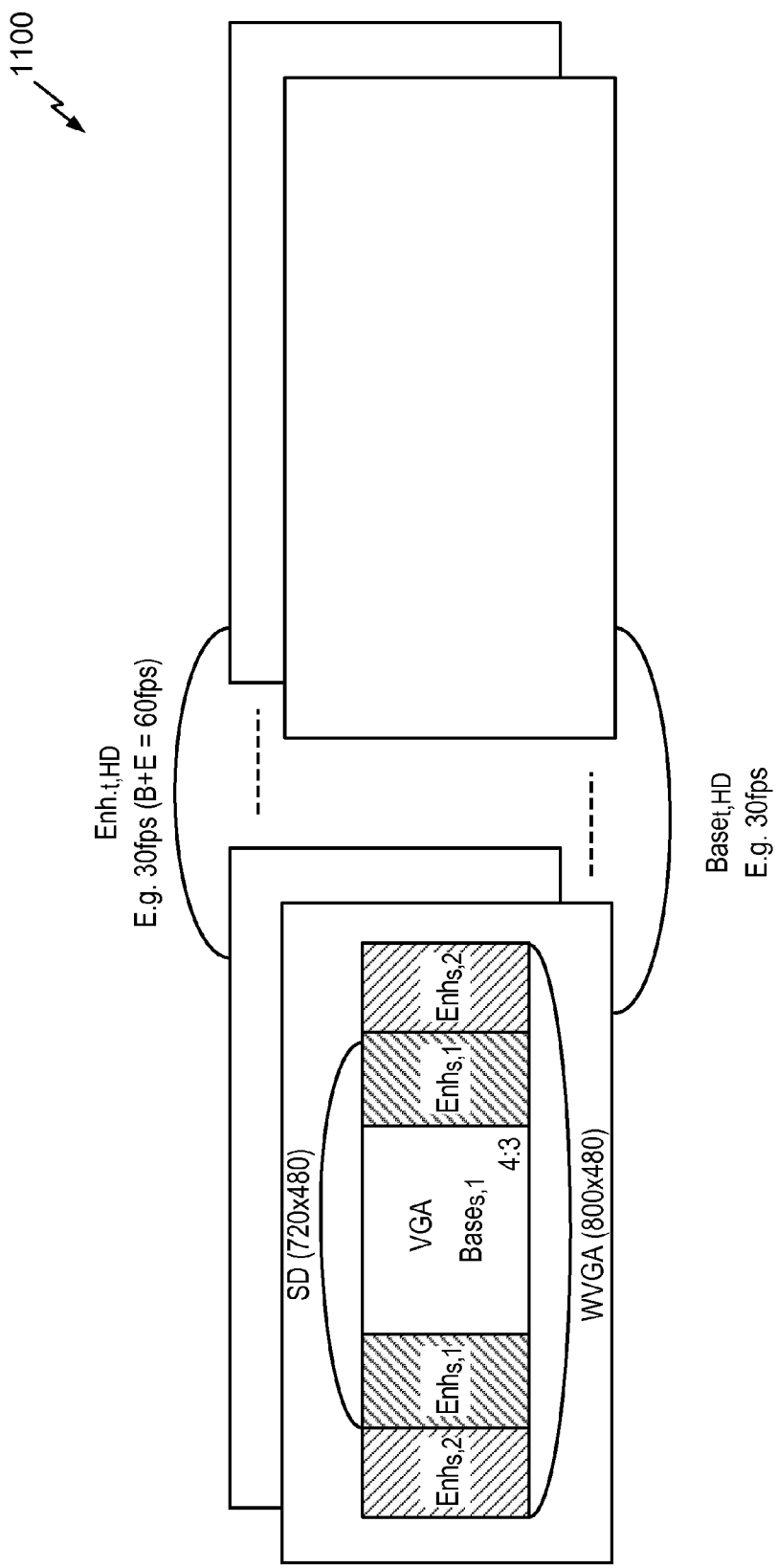
FIG. 11 is an exemplary multiple slice structure.

The scalability module 904 may provide scalability that is primary temporal in order to cater to video having a frame rate of sixty frames per second (60 fps). Two prediction chains may be used with zero GOP or scene based GOP. For example, if a first row of MBs were identified as intra during simple ME provided by the simple ME module 906, the entire frame may be coded as intra, provided a minimum (JOY length was achieved in the previous GOP. As shown in FIG. 11, a multiple slice structure 1100 may also be adapted for scalability.

Figure 12:
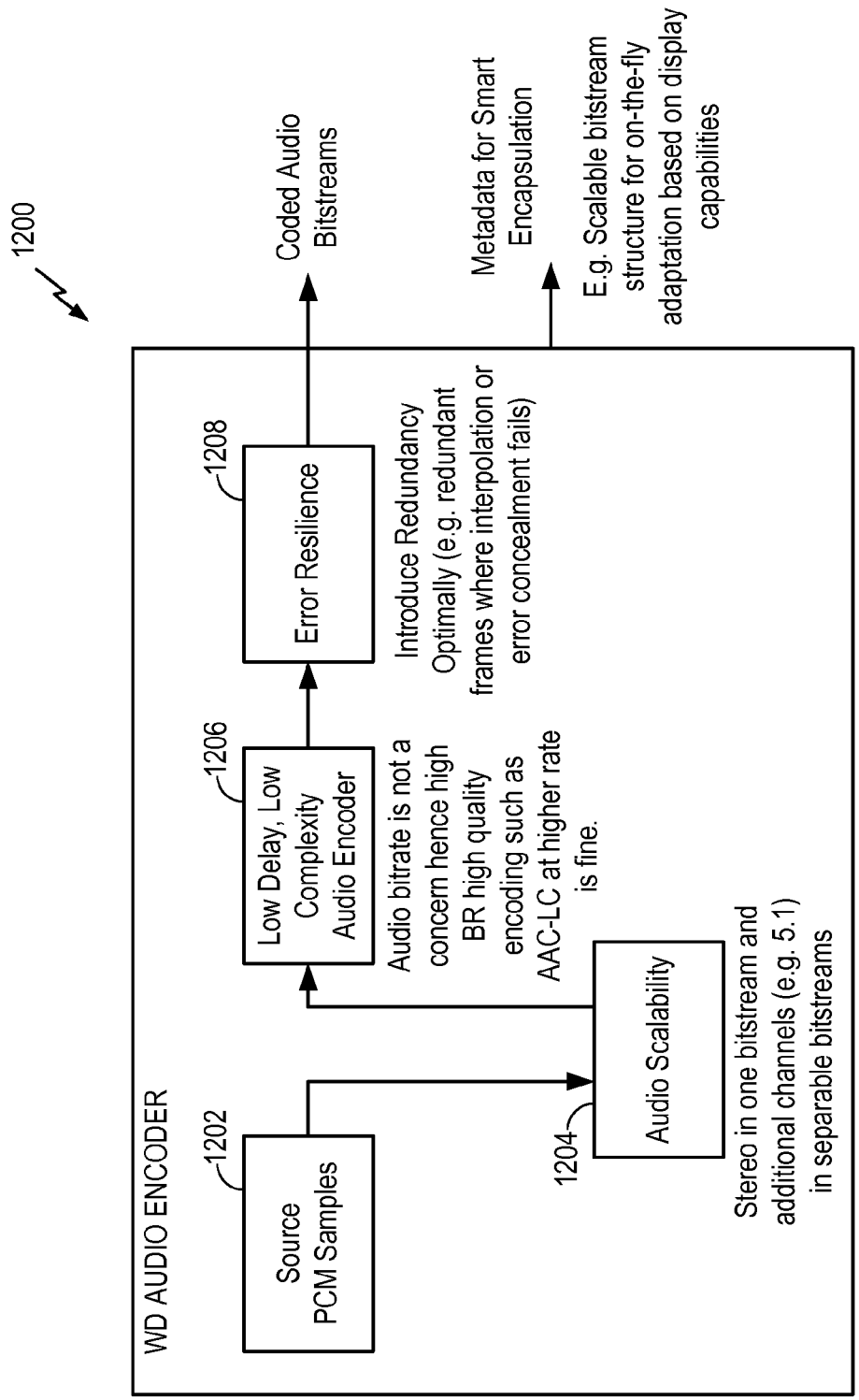
FIG. 12 is a diagram of a wireless device audio encoder.

Referring now to FIG. 12, an exemplary, non-limiting aspect of a WD audio encoder is shown and is generally designated 1200. As shown, the WD audio encoder 1200 may include a source 1202 that may provide one or more pulse code modulation (PCM) samples to one or more downstream components within the WD audio encoder 1200. FIG. 12 illustrates that an audio scalability module 1204 may be connected to the source 1202. Further, a low delay, low complexity audio encoder 1206 may be connected to the audio scalability module 1204. An error resilience module 1208 may be connected to the low delay, low complexity audio encoder 1206.

In a particular aspect, the audio scalability module 1204 may provide stereo audio data in one bitstream and additional channels, e.g., 5.1, in separable bitstreams. Further, scalability may be optional supported through packaging of multi channel audio data into separable bitstreams that may be identified at a transport layer.

In a particular aspect, audio bitrate is not a concern. As such, the low delay, low complexity audio encoder 1206 may utilize high bitrate, high quality encoding, such as advanced audio coding-low complexity (AAC-LC). The error resilience module 1208 may introduce redundancy, e.g., redundant frames where interpolation or error concealment fails.

As depicted in FIG. 12, the WD audio encoder may output coded audio bitstreams and metadata for smart encapsulation, e.g., a scalable bitstream for on-the-fly adaption based on display capabilities.

Figure 13:
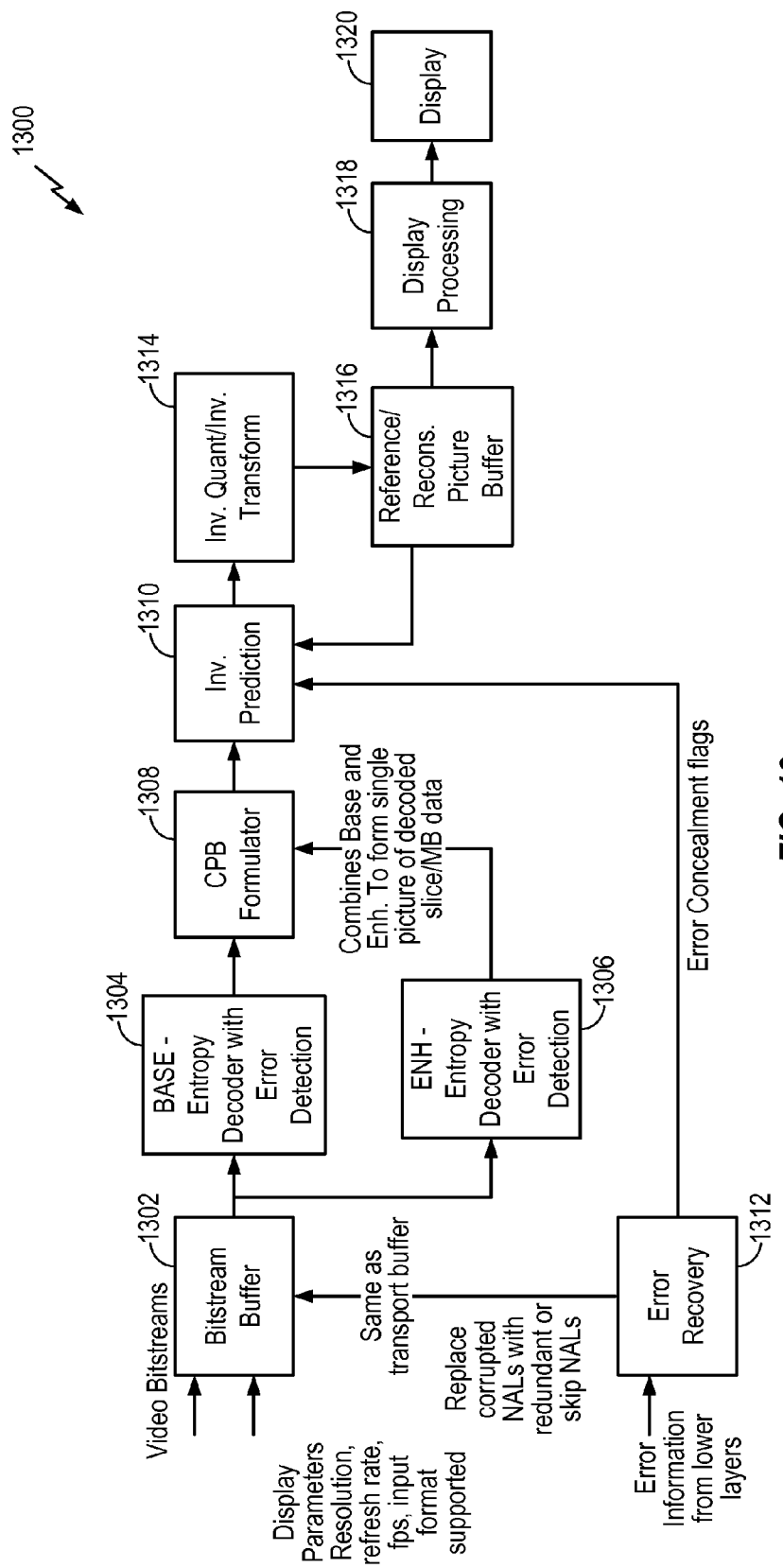
FIG. 13 is a diagram of a wireless device video decoder.

FIG. 13 depicts an exemplary, non-limiting aspect of a WD video decoder 1300. As shown, the WD video decoder 1300 may include a bitstream buffer 1302. A base-entropy decoder 1304 may be connected to the bitstream buffer 1302. The base-entropy decoder 1304 may include error detection. Further, an enhanced-entropy decoder 1306 may also be connected to the bitstream buffer 1302. The enhanced-entropy decoder 1306 may also include error detection.

A CPB formulator module 1308 may be connected to the base-entropy decoder 1304 and the enhanced-entropy decoder 1306. Further, an inverse prediction module 1310 may be connected to the CPB formulator module 1308. As illustrated, an error recovery-module 1312 may be connected to the bitstream buffer 1302 and the inverse prediction module 1310. An inverse quantization/inverse transformation module 1314 may be connected to the inverse prediction module 1310. Moreover, a reference/reconstruction picture buffer 1316 may be connected to the inverse prediction module 1310 and the inverse quantization/inverse transformation module 1314. A display processing module 1318 may be connected to the reference/reconstruction picture buffer 1316 and a display may be connected to the display processing module 1318.

In a particular aspect, one or more display parameters may be input, or otherwise provided, to the bitstream buffer 1302. The display parameters may include a resolution value, a refresh rate, a frame rate, an input format support, or a combination thereof. Error information from one or more lower layers in the WD client may be provided to the error recovery module 1312. The error recovery module 1312 may replace one or more corrupted network abstraction layer (NAL) units with redundant NAL units. Alternatively, the error recovery unit module 1312 may skip the corrupted NAL units. The error recovery module 1312 may also provide one or more error concealment flags to the inverse prediction module 1310. The CPB formulator module 1308 may combine a base image from the base-entropy decoder 1304 with an enhanced image from the enhanced-entropy decoder 1306 to form a single image of decoded slice/MB data.

In a particular aspect, bitstreams provided by a WD host to a WD client may be designed for sequential decoding and buffer management for out of order decoding may not be utilized. Additionally, error concealment flags from error indicators enbedded within the bitstream may override decoding for a current frame and force error concealment either simple copy or substitution of redundant slices in place of erroneous slices.

Figure 14:
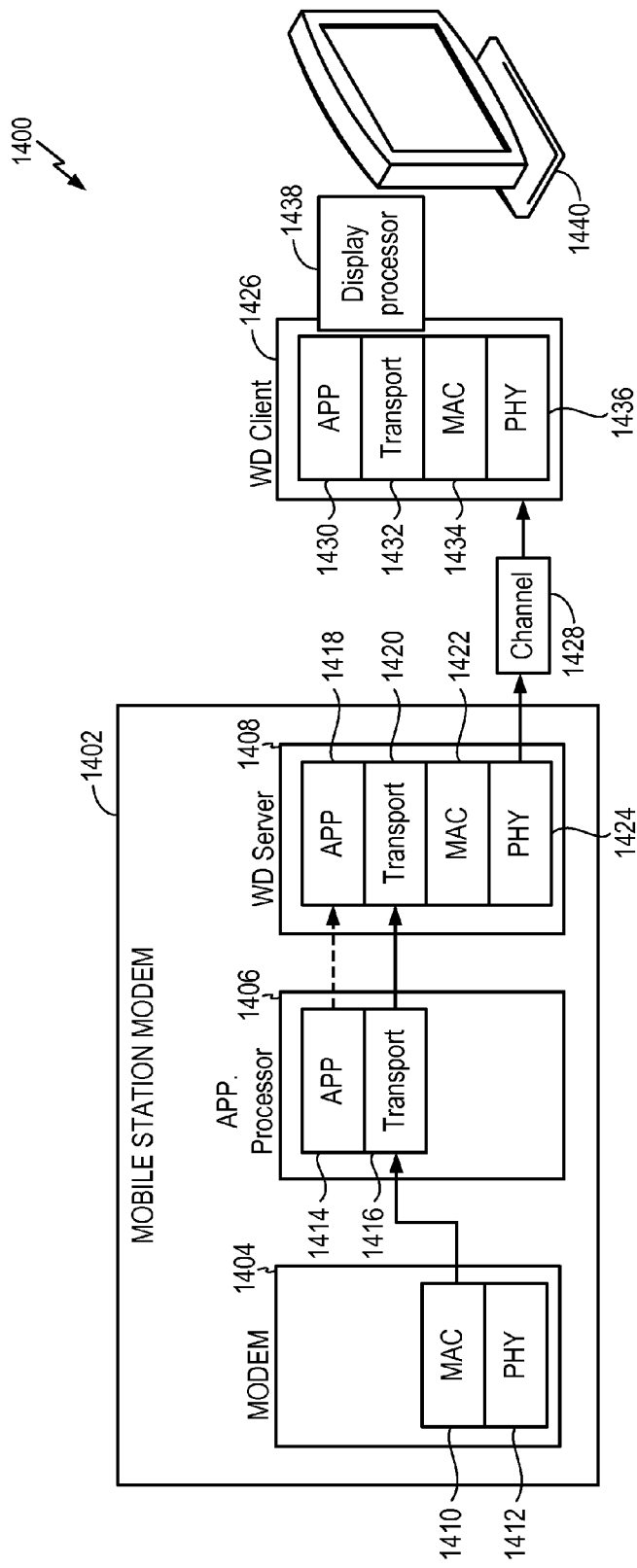
FIG. 14 is a diagram of a third aspect of a wireless display system.

Referring to FIG. 14, a third aspect of a wireless display system is depicted and is generally designated 1400. As shown, the system 1400 may include a mobile station modem 1402. The mobile station modem 1402 may include a modem 1404, an application processor 1406, and a WD server 1408. The modem 1404 may include a MAC layer 1410 and a PHY layer 1412. The application processor 1406 may include an application layer 1414 and a transport layer 1416. The transport layer 1416 within the application processor 1406 may be connected to the MAC layer 1410 within the modem 1404. As shown, the WD server 1408 may include an application layer 1418, a transport layer 1420, a MAC layer 1422, and a PHY layer 1423. The application layer 1418 within the WD server 1408 may be connected to the application layer 1414 within the application processor 1406. Further, the transport layer 1420 within the WD server 1408 may be connected to the transport layer 1416 within the application processor 1406.

FIG. 14 indicates that a WD client 1426 may be connected to the mobile station model 1402 via a channel 1428. As shown, the WD client 1426 may include an application layer 1430, a transport layer 1432, a MAC layer 1434, and a PHY layer 1436. In a particular aspect, the PHY layer 1436 within the WI) client 1426 may be connected to the PHY layer 1424 within the WD server 1408. A display processor 1438 may be connected to the WD client 1426. The display processor 1438 may be connected to, or located within, a display device 1440.

In order to avoid the decoding of content received at the WD host, i.e., the WD server 1408, and reduce latency and power, content may be intercepted at the transport layer 1416 on the receive chain of the application processor 1406 prior to the application layer 1414 within the application processor 1406 processing such as content video or audio decoding.

The application layer 1418 within the WD server 1408 may communicate with all multimedia applications on the mobile station modem 1402, e.g., via Open Interface or an application programming interface (API). Application specific transport packets, e.g. MediaFLO, may be repackaged to WD transport packets. In a particular aspect, audio/video synchronization may be maintained through the appropriate mapping of time stamps. Additionally, media from an output of an MDP may be transmitted to the display 1440 as demanded by the application or when power is not critical on a mobile device, e.g., when the mobile device is being charged. WD packets may be delivered over WD MAC/PHY to the WD client 1426 on the external display where transport packets are parsed. Video data may be sent to a WD video decoder and audio may be sent to a WD audio decoder. The display processor 1438 on, or within, the display device 1440 may further process the decompressed video to fit the display device 1440. This process may include error recovery. Intensive computational operations and power intensive operations may be shifted from a battery powered mobile device to a wall powered display 1440.

One or more aspects of the present disclosure provide a low latency (e.g., desired latency), scalable architecture for wireless display that is power efficient for handhelds. Further, the coding methods described herein satisfy rate adaptation, error resilience/recovery and scalability requirements. Larger bandwidths on WPAN networks, e.g., UWB, may be used to encode at larger bitrates and provide higher quality and improved error robustness through appropriate random access and refresh mechanisms. The use of B-frames may be eliminated and a progressive P-frame/mode may be used to pipeline encoder and decoder operations to reduce end-to-end latency and complexity. The selection of video packets size, e.g. NALU length, may be adapted to meet outer and inner coding rates/block lengths in order to reduce overhead and increase bitrate. One or more of the systems disclosed herein may he streamlined in order to support a systematic pipelined flow of data through the application, transport and MAC/PHY layers in order to reduce latency.

Additionally, in a particular aspect, the systems disclosed herein are transparent to means of reception of content. In other words, media may be received over any of many possible means including conversational, e.g., video telephony; VOD; pseudo-streaming; stored medium; broadcast, e.g., DTV, mobile TV; or a combination thereof. A single content interface format may simplify processing at a WD host. Further, processing requirements at a display may be simplified if MDP is used to modify media to fit display requirements.

Other aspects described herein may minimize the amount of video processing and data transfers over a memory bus. Accordingly, a low power, low cost, low delay solution that is optimized for mobile devices may be provided. This may enable a mobile device to forward multiple received media/content to external display which may present it in various forms customizable by user or application developer. One or more aspects herein may prevent additional generation(s) of compression in order to minimizing the impact on the quality of experience as related to a user experience related to audio-visual quality. An information exchange or a negotiation may not he required to fit the data to display characteristics. Display adaptations may be carried out at a display processor. Further, error resilience at a transport layer may be provided through simple duplication of the appropriate payload.

In a particular aspect, near field communication (NFC) may be used to establish a WD peer-to-peer communication link between a mobile device and a wireless display. In such an aspect, the mobile device and the wireless display may include an NFC reader. NFC may be used for the exchange of encryption keys and WD channel setup information. Such information may include frequency and initial bandwidth for all available short range high speed wireless links. A prioritization protocol running on both mobile and display may decide which of the available common links will be used for the peer-to-peer connection. A follow on NFC exchange may be performed if the primary decision by the protocol fails. In fact, multiple NFC exchanges may be performed. Following a successful decision, a peer-to-peer connection may be established between the mobile device and the wireless display as per the channel parameters dictated by the protocol.

Once the WD channel is established, the WD session may commence and the mobile device may deliver content to the wireless display over the WD channel, or link. Follow on bandwidth and channel re-establishment negotiations may occur over this link. Current links, e.g., W-VGA, W-HDMI, Wireless USB, and future links, e.g., WirelessHD, may be included in the list of available high speed links on the mobile device and the wireless display. The most suitable link may be selected by the WD prioritization protocol.

It is to be understood that the method steps described herein need not necessarily be performed in the order as described. Further, words such as "thereafter," "then," "next," etc. are not intended to limit the order of the steps. These words are simply used to guide the reader through the description of the method steps.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations can be made therein without departing from the spirit and scope of the present invention, as defined by the following claims.

What is claimed is:

1. A method of transmitting content to a wireless display device, the method comprising:
   receiving multimedia data;
   encoding the multimedia data;
   writing encoded multimedia data into a first predetermined memory location of a shared memory;
   encapsulating the encoded multimedia data;
   writing encapsulation data into a second predetermined memory location of the shared memory;
   calculating error control encoding;
   writing the error control encoding into a third predetermined memory location of the shared memory; and
   transmitting the encoded multimedia data, the encapsulation data, and the error control encoding to the wireless display device;
   wherein the first predetermined memory location, the second predetermined memory location, and the third predetermined memory location are allocated based on a channel bandwidth and a packet error rate.

2. The method of claim 1, further comprising:
   determining at least one of the channel bandwidth, the packet error rate and a desired latency.

3. The method of claim 2, further comprising:
   calculating at least one of a video packet size, transport header characteristics and a corresponding length, and an outer coding rate and a corresponding medium access control (MAC) header length.

4. The method of claim 3, wherein the video packet size, the transport header characteristics and the corresponding length, and the outer coding rate and the corresponding MAC header length is determined based on at least one of the channel bandwidth, the packet error rate and the desired latency.

5. The method of claim 4, further comprising:
   allocating a first memory address length for a MAC header;
   allocating a second memory address length for a transport header; and
   allocating a third memory address length for a video packet.

6. The method of claim 5, further comprising:
writing coded video data into the predetermined memory locations of the shared memory.

7. The method of claim 6, further comprising:
obtaining metadata from a video encoder.

8. The method of claim 7, further comprising:
preparing headers for one or more coded video data segments.

9. The method of claim 8, further comprising:
creating parity data for the one or more coded video data segments.

10. The method of claim 9, further comprising:
inserting the parity data at the end of the one or more coded video data segments.

11. A wireless device, comprising:
means for receiving multimedia data;
means for encoding the multimedia data;
means for writing encoded multimedia data into a first predetermined memory location of a shared memory;
means for encapsulating the encoded multimedia data;
means for writing encapsulation data into a second predetermined memory location of the shared memory;
means for calculating error control encoding;
means for writing the error control encoding into a third predetermined memory location of the shared memory; and
means for transmitting the encoded multimedia data, the encapsulation data, and the error control encoding to the wireless device;
wherein the first predetermined memory location, the second predetermined memory location, and the third predetermined memory location are allocated based on a channel bandwidth and a packet error rate.

12. The wireless device of claim 11, further comprising:
means for determining at least one of the channel bandwidth, the packet error rate and a desired latency.

13. The wireless device of claim 12, further comprising:
means for calculating at least one of a video packet size, transport header characteristics and a corresponding length, and an outer coding rate and a corresponding medium access control (MAC) header length.

14. The wireless device of claim 13, wherein the video packet size, the transport header characteristics and the corresponding length, and the outer coding rate and the corresponding MAC header length is determined based on at least one of the channel bandwidth, the packet error rate and the desired latency.

15. The wireless device of claim 14, further comprising:
means for allocating a first memory address length for a MAC header;
means for allocating a second memory address length for a transport header; and
means for allocating a third memory address length for a video packet.

16. The wireless device of claim 15, further comprising:
means for writing coded video data into the predetermined memory locations of the shared memory.

17. The wireless device of claim 16, further comprising:
means for obtaining metadata from a video encoder.

18. The wireless device of claim 17, further comprising:
means for preparing headers for one or more coded video data segments.

19. The wireless device of claim 18, further comprising:
means for creating parity data for the one or more coded video data segments.

20. The wireless device of claim 19, further comprising:
means for inserting the parity data at the end of the one or more coded video data segments.

21. A wireless device, comprising:
a processor, wherein the processor is operable to:
receive multimedia data;
encode the multimedia data;
write encoded multimedia data into a first predetermined memory location of a shared memory;
encapsulate the encoded multimedia data;
write encapsulation data into a second predetermined memory location of the shared memory;
calculate error control encoding;
write the error control encoding into a third predetermined memory location of the shared memory; and
transmit the encoded multimedia data, the encapsulation data, and the error control encoding to the wireless device;
wherein the first predetermined memory location, the second predetermined memory location, and the third predetermined memory location are allocated based on a channel bandwidth and a packet error rate.

22. The wireless device of claim 21, wherein the processor is further operable to:
determine at least one of the channel bandwidth, the packet error rate, and a desired latency.

23. The wireless device of claim 22, wherein the processor is further operable to:
calculate at least one of a video packet size, transport header characteristics and a corresponding length, and an outer coding rate and a corresponding medium access control (MAC) header length.

24. The wireless device of claim 23, wherein the video packet size, the transport header characteristics and the corresponding length, and the outer coding rate and the corresponding MAC header length is determined based on at least one of the channel bandwidth, the packet error rate, and the desired latency.

25. The wireless device of claim 24, wherein the processor is further operable to:
allocate a first memory address length for a MAC header;
allocate a second memory address length for a transport header; and
allocate a third memory address length for a video packet.

26. The wireless device of claim 25, wherein the processor is further operable to:
write coded video data into the predetermined memory locations of the shared memory.

27. The wireless device of claim 26, wherein the processor is further operable to:
obtain metadata from a video encoder.

28. The wireless device of claim 27, wherein the processor is further operable to:
prepare headers for one or more coded video data segments.

29. The wireless device of claim 28, wherein the processor is further operable to:
create parity data for the one or more coded video data segments.

30. The wireless device of claim 29, wherein the processor is further operable to:
insert the parity data at the end of the one or more coded video data segments.

31. A computer program product, the computer program product comprising:
a non-transitory computer-readable medium, the computer-readable medium comprising:

at least one instruction for receiving multimedia data;

at least one instruction for encoding the multimedia data;

at least one instruction for writing encoded multimedia data into a first predetermined memory location of a shared memory;

at least one instruction for encapsulating the encoded multimedia data;

at least one instruction for writing encapsulation data into a second predetermined memory location of the shared memory;

at least one instruction for calculating error control encoding;

at least one instruction for writing the error control encoding into a third predetermined memory location of the shared memory; and at least one instruction for transmitting the encoded multimedia data, the encapsulation data, and the error control encoding to a wireless device;

wherein the first predetermined memory location, the second predetermined memory location, and the third predetermined memory location are allocated based on a channel bandwidth and a packet error rate.

32. The computer program product of claim 31, wherein the computer-readable medium further comprises:

at least one instruction for determining at least one of the channel bandwidth, the packet error rate, and a desired latency.

33. The computer program product of claim 32, wherein the computer-readable medium further comprises:

at least one instruction for calculating at least one of a video packet size, transport header characteristics and a corresponding length, and an outer coding rate and a corresponding medium access control (MAC) header length.

34. The computer program product of claim 33, wherein the video packet size, the transport header characteristics and the corresponding length, and the outer coding rate and the corresponding MAC header length is determined based on at least one of the channel bandwidth, the packet error rate, and the desired latency.

35. The computer program product of claim 34, wherein the computer-readable medium further comprises:

at least one instruction for allocating a first memory address length for a MAC header;

at least one instruction for allocating a second memory address length for a transport header; and at least one instruction for allocating a third memory address length for a video packet.

36. The computer program product of claim 35, wherein the computer-readable medium further comprises:

at least one instruction for writing coded video data into the predetermined memory locations of the shared memory.

37. The computer program product of claim 36, wherein the computer-readable medium further comprises:

at least one instruction for obtaining metadata from a video encoder.

38. The computer program product of claim 37, wherein the computer-readable medium further comprises:

at least one instruction for preparing headers for one or more coded video data segments.

39. The computer program product of claim 38, wherein the computer-readable medium further comprises:

at least one instruction for creating parity data for the one or more coded video data segments.

40. The computer program product of claim 39, wherein the computer-readable medium further comprises:

at least one instruction for inserting the parity data at the end of the one or more coded video data segments.

* * * * *